United States Patent
Yokota et al.

(10) Patent No.: US 10,387,733 B2
(45) Date of Patent: Aug. 20, 2019

(54) PROCESSING APPARATUS, PROCESSING SYSTEM, AND PROCESSING METHOD

(71) Applicants: Soichiro Yokota, Kanagawa (JP); Tomoko Ishigaki, Kanagawa (JP); Hiroyoshi Sekiguchi, Kanagawa (JP); Kenichiroh Saisho, Tokyo (JP)

(72) Inventors: Soichiro Yokota, Kanagawa (JP); Tomoko Ishigaki, Kanagawa (JP); Hiroyoshi Sekiguchi, Kanagawa (JP); Kenichiroh Saisho, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 13 days.

(21) Appl. No.: 15/455,650

(22) Filed: Mar. 10, 2017

(65) Prior Publication Data
US 2017/0185853 A1   Jun. 29, 2017

Related U.S. Application Data

(63) Continuation of application No. 14/710,801, filed on May 13, 2015, now Pat. No. 9,637,118.

(30) Foreign Application Priority Data

May 19, 2014   (JP) .................... 2014-103836
May 19, 2014   (JP) .................... 2014-103838
Apr. 10, 2015   (JP) .................... 2015-081177

(51) Int. Cl.
*G06K 9/00*   (2006.01)
*H04N 5/14*   (2006.01)
(Continued)

(52) U.S. Cl.
CPC ............ *G06K 9/00805* (2013.01); *B60R 1/00* (2013.01); *B60W 30/08* (2013.01); *B60W 30/09* (2013.01);
(Continued)

(58) Field of Classification Search
CPC ..................... G06K 9/00805; G06K 9/00335; G06T 11/60; B60R 1/00; B60R 2300/105;
(Continued)

(56) References Cited

U.S. PATENT DOCUMENTS 4,104,612 A * 8/1978 Lowe ................... G08G 5/0021
                                                                340/973
8,248,410 B2 * 8/2012 Tan ......................... G06T 7/579
                                                                345/420
(Continued)

FOREIGN PATENT DOCUMENTS

JP   H10-096776   4/1998
JP   10-143245 A   5/1998
(Continued)

OTHER PUBLICATIONS

Japanese Office Action dated Feb. 5, 2019 in Japanese Patent Application No. 2015-081177.

*Primary Examiner* — Gregory F Cunningham
(74) *Attorney, Agent, or Firm* — Oblon, McClelland, Maier & Neustadt, L.L.P.

(57) ABSTRACT

A processing apparatus includes a distance image acquirer, a moving-object detector, and a danger-level determining unit. The distance image acquirer acquires a distance image containing distance information of each pixel. The moving-object detector detects a moving object from the distance image. The danger-level determining unit determines a danger level of the moving object by use of the distance image, and outputs the danger level to a controller that controls a controlled unit in accordance with the danger level.

20 Claims, 23 Drawing Sheets

(51) Int. Cl.
| | |
|---|---|
| *H04N 5/232* | (2006.01) |
| *B60W 30/08* | (2012.01) |
| *G06T 7/246* | (2017.01) |
| *G06T 7/277* | (2017.01) |
| *B60R 1/00* | (2006.01) |
| *B60W 30/09* | (2012.01) |
| *B60W 30/14* | (2006.01) |
| *B60W 50/14* | (2012.01) |
| *G06T 11/60* | (2006.01) |
| *G08G 1/16* | (2006.01) |

(52) U.S. Cl.
CPC .......... *B60W 30/143* (2013.01); *B60W 50/14* (2013.01); *G06K 9/00335* (2013.01); *G06K 9/00791* (2013.01); *G06T 7/251* (2017.01); *G06T 7/277* (2017.01); *G06T 11/60* (2013.01); *G08G 1/166* (2013.01); *H04N 5/14* (2013.01); *H04N 5/145* (2013.01); *H04N 5/147* (2013.01); *H04N 5/232* (2013.01); *H04N 5/23254* (2013.01); *H04N 5/23264* (2013.01); *B60K 2350/2013* (2013.01); *B60K 2350/2052* (2013.01); *B60K 2350/352* (2013.01); *B60K 2350/921* (2013.01); *B60R 2300/105* (2013.01); *B60R 2300/107* (2013.01); *B60R 2300/205* (2013.01); *B60R 2300/301* (2013.01); *B60R 2300/302* (2013.01); *B60R 2300/303* (2013.01); *B60W 2050/143* (2013.01); *B60W 2050/146* (2013.01); *B60W 2420/42* (2013.01); *B60W 2510/18* (2013.01); *B60W 2510/20* (2013.01); *B60W 2520/105* (2013.01); *B60W 2520/14* (2013.01); *B60W 2550/10* (2013.01); *B60W 2550/30* (2013.01); *B60W 2710/18* (2013.01); *B60W 2710/20* (2013.01); *B60W 2720/106* (2013.01); *B60W 2720/14* (2013.01); *B60W 2750/30* (2013.01); *G06T 2207/10016* (2013.01); *G06T 2207/10021* (2013.01); *G06T 2207/10028* (2013.01); *G06T 2207/30236* (2013.01); *G06T 2207/30241* (2013.01); *G06T 2207/30261* (2013.01)

(58) Field of Classification Search
CPC ........ B60R 2300/107; B60R 2300/205; B60R 2300/301; B60R 2300/302; B60R 2300/303; G08G 1/166; B60W 30/09; B60W 30/143; B60W 50/14; B60K 2350/921; B60K 2350/2013
USPC ....................................................... 382/103
See application file for complete search history.

(56) References Cited

U.S. PATENT DOCUMENTS

| | | | |
|---|---|---|---|
| 8,489,284 B2 | 7/2013 | Emam | |
| 8,939,366 B1 * | 1/2015 | Kelly | F41G 3/04 235/400 |
| 2003/0231239 A1 * | 12/2003 | Corzilius | G06F 3/005 348/207.1 |
| 2009/0097710 A1 * | 4/2009 | Sroka | G06T 15/20 382/103 |
| 2009/0153566 A1 * | 6/2009 | Anderson | G06T 13/40 345/473 |
| 2010/0094502 A1 | 4/2010 | Ito | |
| 2011/0211068 A1 | 9/2011 | Yokota | |
| 2011/0228975 A1 * | 9/2011 | Hennessey | A61B 3/113 382/103 |
| 2011/0242104 A1 * | 10/2011 | Zhang | H04N 13/183 345/419 |
| 2012/0242835 A1 | 9/2012 | Li et al. | |
| 2013/0088578 A1 | 4/2013 | Umezawa et al. | |
| 2013/0241971 A1 * | 9/2013 | Sekiya | G02B 26/101 345/690 |
| 2014/0037138 A1 | 2/2014 | Sato et al. | |
| 2014/0177022 A1 | 6/2014 | Saisho et al. | |
| 2014/0226015 A1 | 8/2014 | Takatsudo | |
| 2014/0229068 A1 * | 8/2014 | Ueyama | B62D 15/0255 701/41 |
| 2014/0245367 A1 * | 8/2014 | Sasaki | H04N 21/4402 725/109 |
| 2015/0049195 A1 | 2/2015 | Ishigaki et al. | |
| 2015/0332103 A1 | 11/2015 | Yokota et al. | |
| 2015/0334269 A1 * | 11/2015 | Yokota | G06K 9/00805 382/103 |
| 2017/0123750 A1 * | 5/2017 | Todasco | G06F 3/1454 |
| 2017/0220863 A1 * | 8/2017 | Lection | G06T 11/001 |
| 2017/0282813 A1 * | 10/2017 | Hashimoto | B60R 1/00 |
| 2018/0090007 A1 * | 3/2018 | Takemori | B60K 35/00 |

FOREIGN PATENT DOCUMENTS

| | | | |
|---|---|---|---|
| JP | 2000-266539 | 9/2000 | |
| JP | 2005-352636 A | 12/2005 | |
| JP | 2006-350934 | 12/2006 | |
| JP | 2008-034981 | 2/2008 | |
| JP | 2010-282388 A | 12/2010 | |
| JP | 2009284950 | 6/2011 | |
| JP | 2013097392 A * | 5/2013 | ............... G06T 7/20 |
| JP | 2013097392 A * | 5/2013 | ............... G06T 7/20 |
| JP | 2013-112269 | 6/2013 | |
| JP | 2012071063 | 7/2013 | |
| JP | 5371725 | 9/2013 | |
| JP | 2013-203103 | 10/2013 | |
| JP | 2014-010800 | 1/2014 | |
| JP | 2014-29604 A | 2/2014 | |
| JP | 2016-1170 A | 1/2016 | |
| JP | 2016-1463 A | 1/2016 | |
| JP | 2016-1464 A | 1/2016 | |
| WO | 2011/078300 A1 | 6/2011 | |

* cited by examiner

HAVING ROAD-SLOPING APPROXIMATION CURVES
AT EACH OF RIGHT AND LEFT ROAD EDGES, FOR
CERTAIN NUMBER OF SEGMENTS OBTAINED BY
DIVIDING SLOPE BY GIVEN DISTANCE

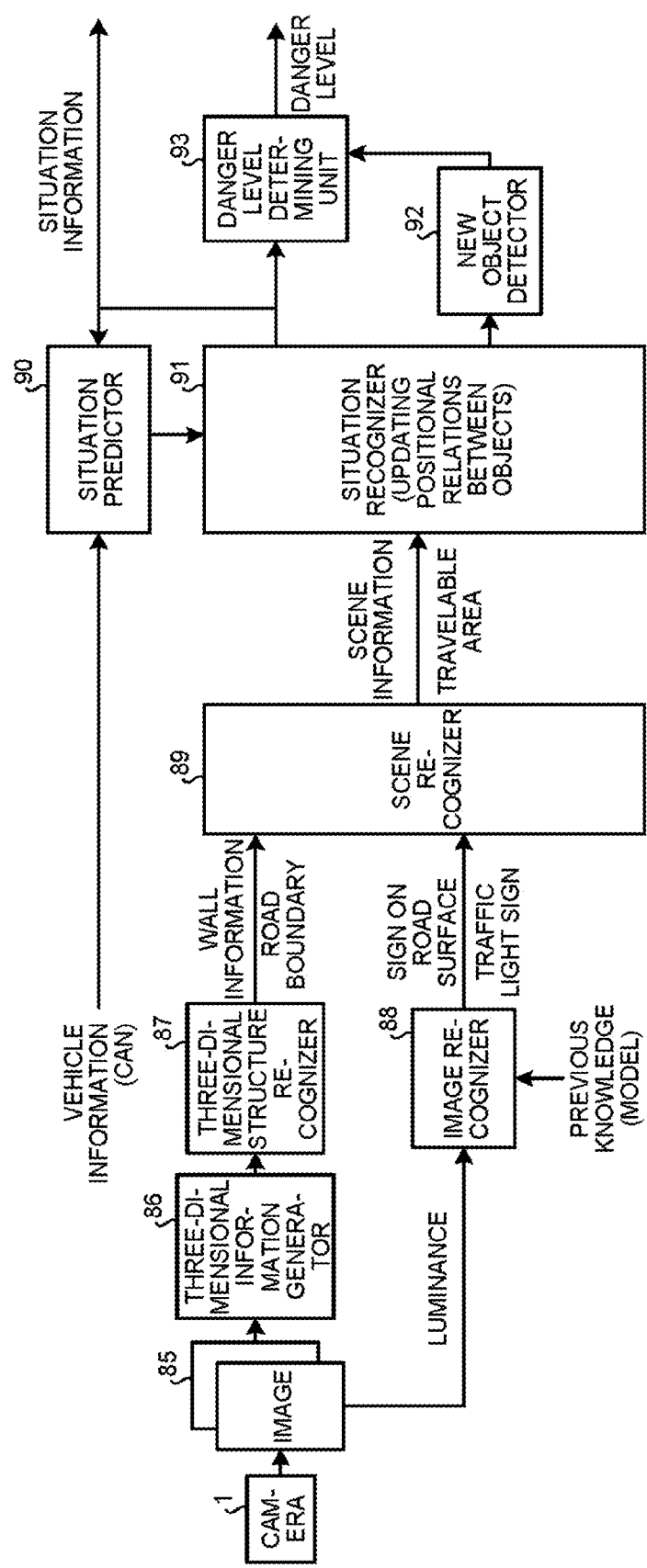

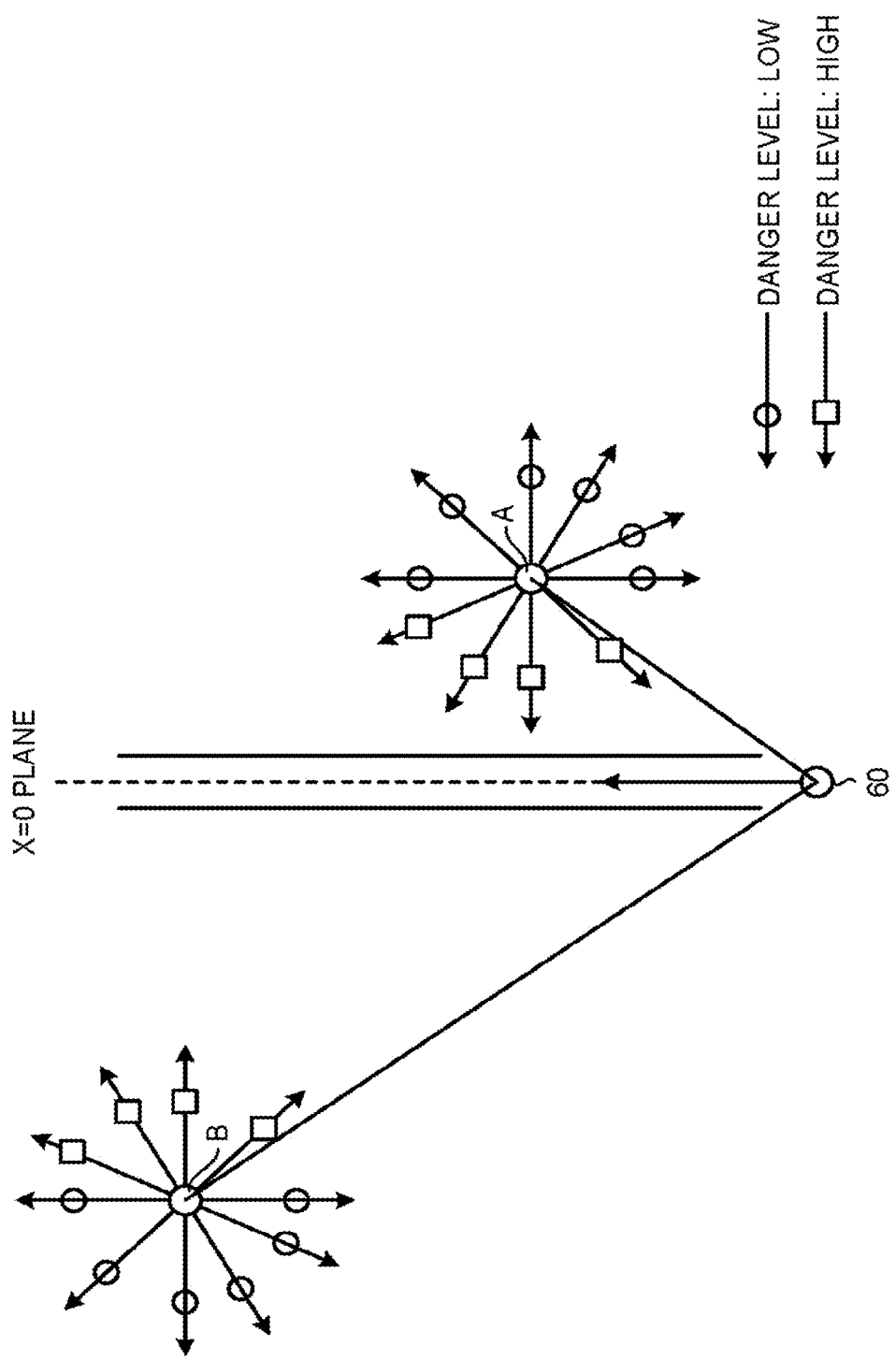

PROCESSING APPARATUS, PROCESSING SYSTEM, AND PROCESSING METHOD

CROSS-REFERENCE TO RELATED APPLICATIONS

The present application is a continuation application of U.S. application Ser. No. 14/710,801, filed May 13, 2015, which claims priority to Japanese Patent Application No. 2014-103838 filed in Japan on May 19, 2014, Japanese Patent Application No. 2014-103836 filed in Japan on May 19, 2014, and Japanese Patent Application No. 2015-81177 filed in Japan on Apr. 10, 2015. The entire contents of the above-identified applications are incorporated herein by reference.

BACKGROUND OF THE INVENTION

1. Field of the Invention

The present invention relates to a processing apparatus, a processing system, and a processing method.

2. Description of the Related Art

In recent years, moving-object recognition apparatuses have been developed, which recognize a speed and a change in movement of a moving object such as a vehicle traveling ahead of a user's vehicle or a pedestrian, detect a dangerous situation in its early stage, and notify a driver thereof so as to avoid the danger. Examples of the dangerous situation include sudden braking of the vehicle traveling ahead, another car coming in between the user's vehicle and the vehicle traveling ahead, and a pedestrian running into the road.

For example, there is a method that includes, for recognition of a moving object in front, obtaining changes in distance to the object in front by using changes in size of the object between image frames of two-dimensional images and the focal distance of a camera. However, one disadvantage is that, with this method, the measurement accuracy of this method for the distance to an object, more specifically, for example, the detection accuracy for changes in movement of a moving object is low.

To address this disadvantage, Japanese Laid-open Patent Publication No. 2000-266539 discloses an inter-vehicle distance measuring apparatus that obtains parallax images (also called distance images) by calculating parallax from stereo images obtained by a stereo camera apparatus. Note that a parallax image refers to an image obtained by converting parallax into brightness.

This inter-vehicle distance measuring apparatus disclosed in Japanese Laid-open Patent Publication No. 2000-266539 detects a vehicle in front by using parallax images, and measures the distance between the vehicles and changes in the distance by using the size and direction of a motion vector of an edge of the detected vehicle.

When equipment such as a vehicle is controlled, the capability to control equipment such as the vehicle on the basis of danger levels determined according to the current situation, or the capability to provide useful information such as information on driving to, for example, a driver of the vehicle contributes to improved safety.

Therefore, there is a need for a processing apparatus, a processing system, and a processing method that enables equipment control according to danger levels and provision of useful information.

SUMMARY OF THE INVENTION

It is an object of the present invention to at least partially solve the problems in the conventional technology.

According to an embodiment, a processing apparatus includes a distance image acquirer, a moving-object detector, and a danger-level determining unit. The distance image acquirer acquires a distance image containing distance information of each pixel. The moving-object detector detects a moving object from the distance image. The danger-level determining unit determines a danger level of the moving object by use of the distance image, and outputs the danger level to a controller that controls a controlled unit in accordance with the danger level.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is a functional block diagram of a three-dimensional object recognition apparatus of a third embodiment;

FIG. 19 is a diagram for explaining operation performed by the three-dimensional object recognition apparatus of the third embodiment to calculate danger levels;

DETAILED DESCRIPTION OF THE PREFERRED EMBODIMENTS

Described below in detail with reference to the drawings are embodiments of three-dimensional object recognition apparatuses to which a processing apparatus, a processing system, a processing program, and a processing method according to the present invention are applied. The following description uses the term "control subject" to refer to a subject to be controlled by use of recognition results from any of the three-dimensional object recognition apparatuses of the embodiments, such as a vehicle of a user. In addition, the description uses the term "recognition target" to refer to an object that calls for the control over a control subject, such as a vehicle travelling ahead, out of objects to be recognized by any of the three-dimensional object recognition apparatuses of the embodiments.

First Embodiment

Figure 1:
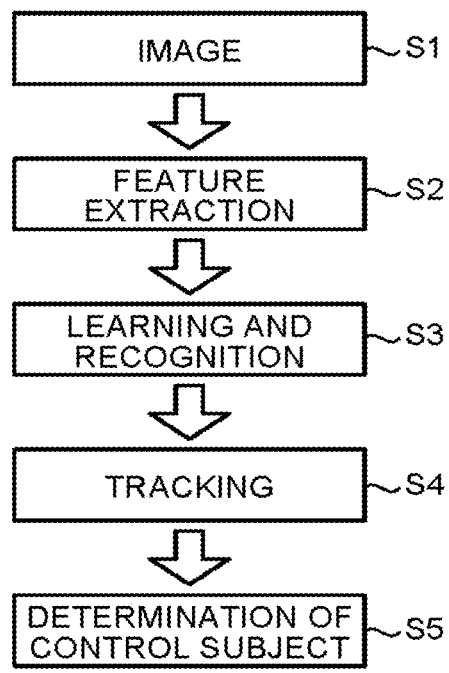
FIG. 1 is a diagram illustrating a procedure for a general case of three-dimensional object recognition processing.

Illustrated first in FIG. 1 is a procedure of a general case of a three-dimensional object recognition processing. As illustrated in FIG. 1, the general case of three-dimensional object recognition processing includes acquiring images captured by, for example, a camera apparatus at step S1, and extracting feature points from the acquired images at step S2. The processing further includes recognizing objects from the feature points at step S3, and tracking each of the objects while checking the correspondence of the centroids of the recognition-target objects with the recognition history of the centroids of the thus far recognition-target objects at step S4. For example, when a control subject to be controlled with the recognition result is an automatic braking system, the processing further includes performing control, such as automatic braking, depending on the recognition results for the respective objects, at step S5.

When such three-dimensional object recognition processing involves changes in recognition of an object from a recognized state to an unrecognized state and vice versa between frames, the following inconvenience (hunting) occurs. For example, in the case of a vehicle, when the vehicle becomes recognized after once having become unrecognized brings a situation where a user's vehicle and the vehicle traveling ahead are more distant from each other than expected, or, to the contrary, the vehicle ahead is found very close in front of a user's vehicle because of braking of the vehicle ahead. It is therefore important to stably continuously recognize a recognition target so as to avoid such an inconvenience.

However, when a recognition target is recognized based on edge information of objects, recognition of edge information changes from a recognized state to an unrecognized state or vice versa because a sensitivity property of a sensor, a lighting condition, or the like changes, even in imaging of the same recognition target. For example, during traveling, the recognition target becomes unrecognized when the position of the sun or the back-lit state changes, when the recognition target disappears behind the far side of another object, or when the user's vehicle is hidden by an object such as a building. Furthermore, when a value of the edge information of the recognition target is close to a threshold of a recognition algorithm because the recognition target is under a dim condition, the recognition target may become unrecognized because of variation in sensor sensitivity. Avoiding these inconveniences necessitates adjustment of parameters in the recognition algorithm, such as adjustment of a threshold in recognition logic for one frame.

Here, an object recognition algorithm aimed at "recognizing objects" is applied to the general case of three-dimensional object recognition processing. This object recognition algorithm aimed at "recognizing objects" has been developed in order to achieve performance that is robust over changes in external light and changes in how the recognition target is recognized, which are various as described above, and that achieves the highest recognition rate. More specifically, the algorithm has been developed with the aim of accurately recognizing as many objects as possible from within one frame regardless of how objects are seen and where these objects are positioned within images. This algorithm therefore does not establish the order of priority in recognition among objects contained in one frame, and has parameters adjusted so that all of the objects may be uniformly recognized.

However, over time, there are frequent changes in how an object set as a recognition target is seen. This is because, while the control subject such as the user's vehicle is autonomously moving, the recognition target such as a vehicle ahead is also autonomously moving. For example, such a change occurs when the vehicle ahead is traveling along a curve of a road surface, or when the vehicle ahead changes lanes to an adjacent lane. Under such a situation, the vehicle ahead often becomes unrecognized because of a change in how the vehicle ahead is seen. In addition, when parameters in the recognition algorithm are adjusted such that the vehicle ahead is recognizable even under such situation, the following inconvenience, for example, occurs: even under normal situations, such as when recognition is performed on the vehicle ahead on a straight road, the recognition target becomes unrecognized or incorrectly recognized.

In thus attempting to recognize all of the recognition targets under various situations (i.e., a recognition algorithm that has parameters adjusted at the aim of recognizing recognition targets), a trade-off is inevitable between having each recognition target unrecognized and having it incorrectly recognized, which leaves no choice but to take a large number of development steps and enormous development time to construct a balance design between having recognition targets unrecognized and having them incorrectly recognized. Furthermore, despite adjustment such as parameter adjustment incorporated in such a balance design, an inconvenience of having a recognition target unrecognized or incorrectly recognized occurs under normal situations.

Control of a control subject such as an automatic braking system of an automobile is not performed based on a result of recognition where an object has been recognized only once, but is continuously performed based on results of recognition where the object is continuously recognized over time. In controlling a control subject, it is therefore important to reliably recognize and track a recognition target that necessitates the control. This idea applies not only to automobiles but also to robots, agricultural machines, and heavy machines. More specifically, when the purpose is to control a control subject, what matters is not to uniformly recognize all of the objects but to reliably recognize and track a recognition target that accounts for the control.

Furthermore, in object recognition for controlling a control subject, it is preferred that:

(1) the recognition be performed with the order of priority assigned to recognition targets;

(2) continuous recognition (tracking and capturing) of a recognition target that has been recognized once be enabled without treating the recognition target as unrecognized;

(3) an object the recognition conditions of which have been unstable be set ineligible for being a control subject; and (4) a reason for having an object unrecognized or incorrectly recognized be identifiable.

With regard to the order of priority mentioned in (1), recognition targets immediately in front are ranked at high positions in the order of priority. A recognition targets found at an edge is positioned low in the order of priority. With regard to (2), if a target that has been recognized once is treated as unrecognized, this makes it impossible to perform sufficiently suitable control. A control subject as described in (3) results in an inconvenience such as hunting described above. The reason identification in (4) is needed, for example, for correcting a computer program for object recognition control. For example, when an error in braking operation has occurred with a driving safety system that controls a brake for an automobile, making a cause thereof identifiable is important for, for example, correction of a computer program. For this reason, an algorithm the processing state of which is unclear, such as learning, is not a suitable selection for use in object recognition control. Furthermore, in the above-described balance design, a recognition algorithm for object recognition control is often adjusted with more importance attached to prevention of incorrect recognition than reduction of the number of times objects become unrecognized. In other words, a recognition algorithm for object recognition control is often adjusted so that safety may be enhanced by prevention of operational errors due to incorrect recognition.

Thus, in the first place, a three-dimensional object recognition apparatus of a first embodiment recognizes the current situation from the "internal situation" such as the traveling speed of a control subject (for example, the user's vehicle), and the "external situation" such as presence or absence of a recognition target that has already been recognized (such as a vehicle traveling ahead, a wall, or a road). Successful recognition of the current situation makes it possible to predict that, for example, a person comes out in front of the user's vehicle from behind the vehicle traveling ahead (predict what happens next). Therefore, the prediction result can be reflected in the future control. For example, a recognition target that has been stably recognized is determined to be high in the order of priority, and a simple algorithm with a lower threshold is applied so that the recognition target can be recognized even when a certain brightness change has occurred. Furthermore, even when the shape of a recognition target (the vehicle traveling ahead) changes or has become difficult to recognize because of a curve of a road or the like, proactive recognition is performed as long as such a change is a predicted change. More specifically, the three-dimensional object recognition apparatus of the first embodiment uses a plurality of algorithms or weights of an algorithm while allowing changes to or selecting from among these algorithms or the weights on the basis of situation determination and prediction. The apparatus can therefore substantially improve the accuracy of object recognition.

Other than changing thresholds, the following is considered possible. While, for example, a plurality of algorithms such as those to check whether a recognition target is an object that is on a road surface, and whether it is symmetric are used in a typical recognition technique, some of these algorithms may be omitted for a stably recognized subject. The point is that the three-dimensional object recognition apparatus is characterized by using different recognition methods according to a future external situation based on an external situation recognized in an imaged region.

In a predetermined frame of imaging, the three-dimensional object recognition apparatus of the embodiment tracks a previously-detected object recognized in a preceding frame, and, then, after eliminating the previously-detected object, recognizes a new object. While a previously-detected object that has been stably recognized can be continuously tracked with high accuracy, a new object can be recognized with improved accuracy.

Figure 2:
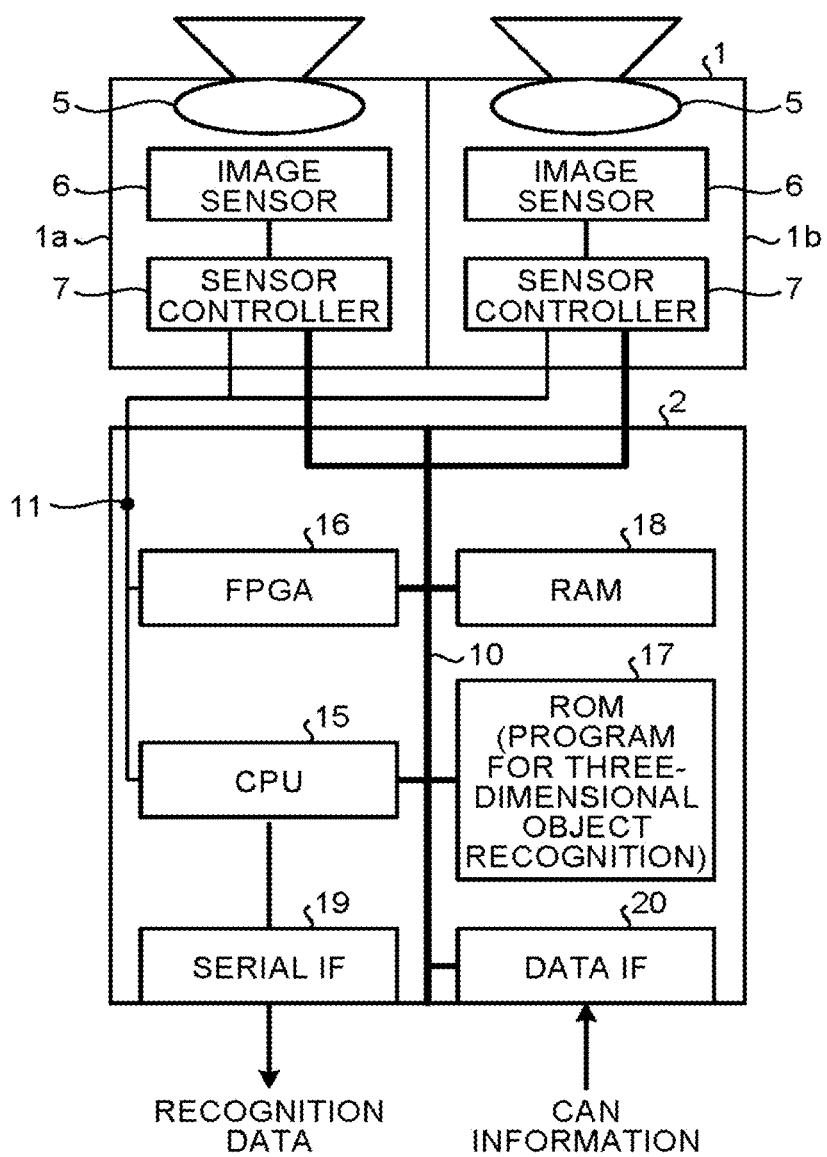
FIG. 2 is a hardware configuration diagram of the main part of a three-dimensional object recognition apparatus of an embodiment.

FIG. 2 illustrates a hardware configuration diagram of the three-dimensional object recognition apparatus of the first embodiment. As illustrated in FIG. 2, the three-dimensional object recognition apparatus of the first embodiment includes a stereo camera unit 1 and an information processor 2.

The stereo camera unit 1 is constructed with two camera units assembled in parallel with each other, which are a first camera unit 1a for the left eye and a second camera unit 1b for the right eye. Each of the camera units 1a and 1b includes a lens 5, an image sensor 6, and a sensor controller 7. The image sensor 6 is implemented in the form of, for example, a CCD image sensor or a CMOS image sensor. CCD stands for "Charge Coupled Device". CMOS stands for "Complementary Metal-Oxide Semiconductor". The sensor controller 7 performs such control as exposure control on the image sensor 6, image read-out control, communication with an external circuit, and image data transmission control.

The information processor 2 includes a data bus line 10, a serial bus line 11, a CPU 15, an FPGA 16, a ROM 17, a RAM 18, a serial IF 19, and a data IF 20. CPU stands for "Central Processing Unit". FPGA stands for "Field-Programmable Gate Array". ROM stands for "Read Only Memory". RAM stands for "Random Access Memory". IF stands for "interface".

The above-described stereo camera unit 1 is connected to the information processor 2 via the data bus line 10 and the serial bus line 11. The CPU 15 performs execution control of the entire operation of the information processor 2, image processing, and image recognition processing. Luminance image data from captured images captured by the image sensors 6 of the respective camera units 1a and 1b is written into the RAM 18 of the information processor 2 via the data bus line 10. Such data as sensor exposure-value change control data, image read-out parameter change control data, and various setting data from the CPU 15 or the FPGA 16 is transmitted and received via the serial bus line 11.

The FPGA 16 generates a parallax image by performing essentially real-time processing, such as gamma correction, distortion correction (parallelization of right and left images), and block-matching based parallax calculation, on image data stored in the RAM 18, and then writes the parallax image back into the RAM 18. A parallax image is one example of a distance image. The CPU 15 performs control of the sensor controllers 7 of the stereo camera unit 1 and overall control of the information processor 2. The ROM 17 stores therein a three-dimensional object recognition program for executing, for example, situation recognition, prediction, and three-dimensional object recognition, which are described later. The three-dimensional object recognition program is one example of processing program. The CPU 15 acquires, for example, CAN information (such as a vehicle speed, acceleration, a steer angle, and a yaw rate) of the user's vehicle as parameters via the data IF 20. The CPU 15 then recognizes a recognition target such as a vehicle traveling ahead by performing execution control on various pieces of processing such as the situation recognition, in accordance with the three-dimensional object recognition program stored in the ROM 17 and using the parallax images stored in the RAM 18. CAN stands for "Controller Area Network".

Recognition data for a recognition target is fed to external equipment such as an automatic braking system or an automatic speed control system via the serial IF 19. The automatic braking system uses the recognition data for recognition targets to control braking of the user's vehicle. The automatic speed control system uses the recognition data for a recognition target to control the speed of the user's vehicle.

Figure 3:
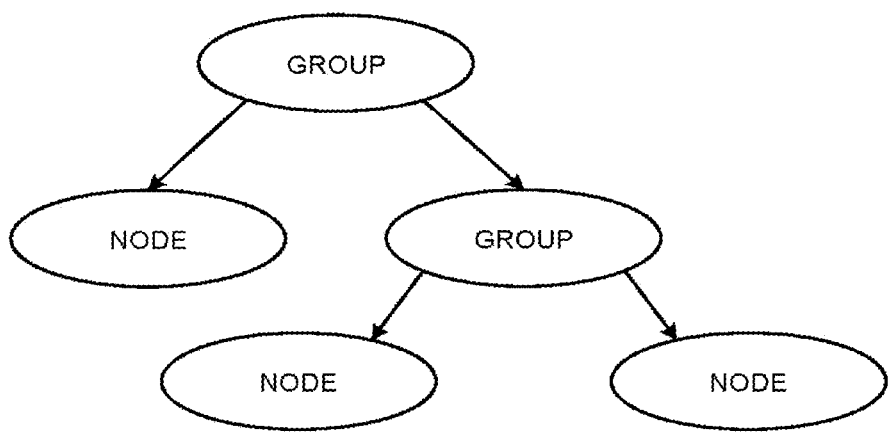
FIG. 3 is a schematic for explaining a scene graph.
Figure 4:
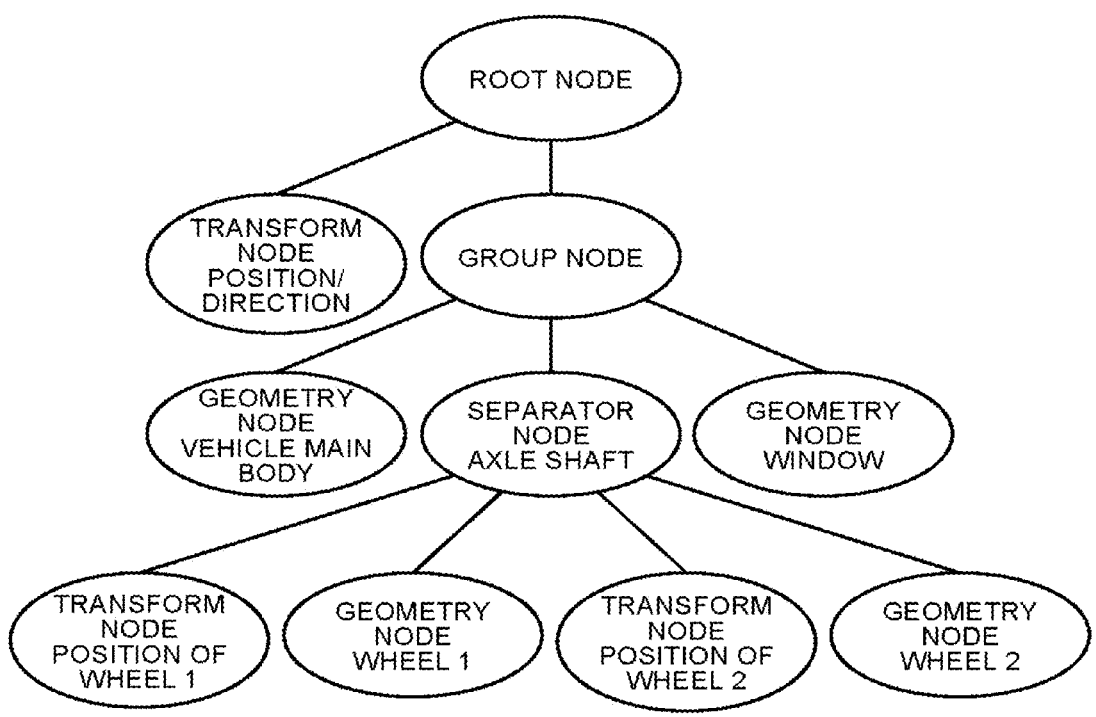
FIG. 4 is a schematic for explaining a vehicle scene graph.

Additionally, the three-dimensional object recognition apparatus of the first embodiment is configured to describe three-dimensional objects, such as a person and a vehicle, and the current situation, as scene graphs. FIG. 3 illustrates a basic structure of a scene graph, and FIG. 4 illustrates one example of a scene graph regarding a vehicle. As can be understood from FIG. 3 and FIG. 4, a scene graph is formed in a tree structure. A scene graph is described in a language such as BIFS or VRML. BIFS stands for "Binary Format for Scene description". VRML stands for "Virtual Reality Modeling Language". In a scene graph, a group is formed by hierarchically combining constituent units called nodes, and such groups collectively constitute a scene (situation). A node is a constituent unit of a situation that has fields such as a light source, a shape, a material, and coordinates, and is hierarchically described by having further lower nodes.

Figure 5:
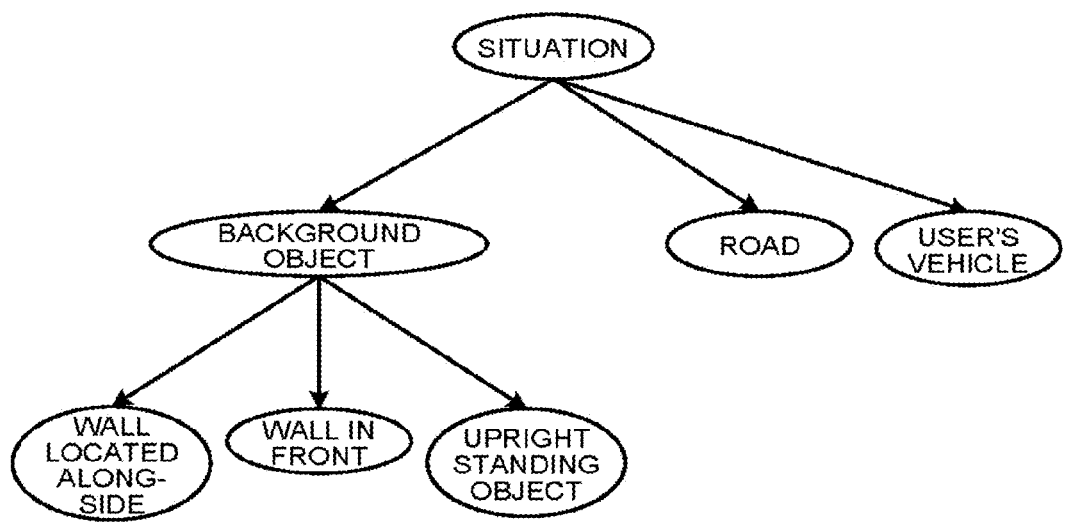
FIG. 5 is a diagram illustrating a scene graph for a scene situation model described by the three-dimensional object recognition apparatus of the embodiment.

FIG. 5 illustrates one example of a "scene situation model", which is a scene graph having the current situation described therein. This scene situation model in FIG. 5 is an example of describing a situation that is useful for monitoring an area in front of the user's vehicle. In this example illustrated in FIG. 5, nodes for "background objects", "roads", and the "user's vehicle" are described. Additionally, nodes for "walls located alongside", "walls in front", and "upright standing objects" are described as lower nodes for the "background objects" node. Each node has entities such as a three-dimensional position, a centroid, a relative speed, a size, and reliability. Some nodes may have information specific to the respective nodes such as a road surface height, a road edge position (travelable region), or a curve curvature of a road.

Figure 6:
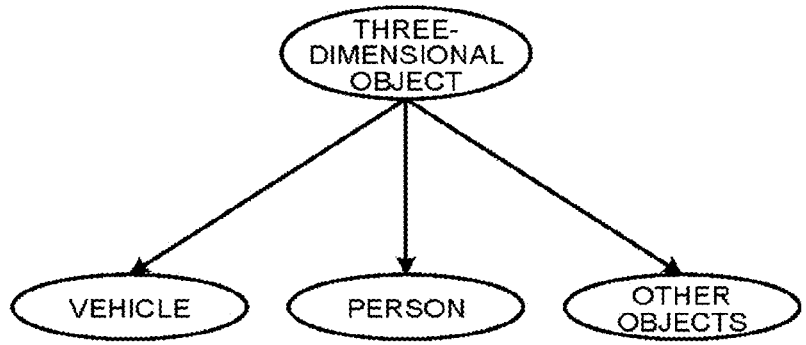
FIG. 6 is a diagram illustrating a scene graph for a three-dimensional object model described by the three-dimensional object recognition apparatus of the embodiment.

FIG. 6 illustrates one example of a "three-dimensional object model", which is a scene graph having three-dimensional objects described therein. In an application aimed at collision avoidance through braking control, steering control or the like of the control subject, the largest recognition target is a recognition target included in a group of three-dimensional objects that include persons and vehicles. The three-dimensional object recognition apparatus of the first embodiment is configured to describe the three-dimensional model, separately from the above-described scene situation model. In this example illustrated in FIG. 6, nodes for "vehicles", "persons", and the "other objects" are described. A node in the three-dimensional object model is described so as to have a structure as with the above-described entities regarding a background object, such as a three-dimensional position, a centroid, a relative speed, a size, and reliability, and additionally have entities such as a more specific three-dimensional object category and a moving direction. As the three-dimensional object category, for example, a category as to whether the three-dimensional object is an oversize vehicle or a standard-size vehicle is described when the object is a vehicle. Otherwise, for example, a category as to whether the three-dimensional object is an adult or a child is described when the object is a person.

The above-described "scene situation model" and "three-dimensional object model" have been predefined and have been stored in the ROM 17. While scenes to be described in the scene situation model are specifically situations such as an express highway and a school zone, three-dimensional objects to be described in the three-dimensional object model are specifically stationary objects such as signs and a traffic lights and moving objects such as vehicles and persons.

In a control subject such as an automatic braking system or an automatic speed control system, the control is performed when a recognition result for the three-dimensional objects explained with FIG. 6 is determined to be dangerous according to calculation based on the position and the speed contained in the CAN information of the scene situation model explained with FIG. 5. The control is performed also when calculation indicates the danger of colliding with a background object. The three-dimensional object recognition apparatus of the first embodiment determines the order of priority among recognition targets in the next frame by calculating possibilities of collision with recognized three-dimensional objects (including background objects) with reference to the position of the user's vehicle and road information.

The scene situation model and the three-dimensional object model illustrated in FIG. 5 and FIG. 6 are recognized with respect to each frame of images captured by the stereo camera unit 1, recorded and updated as history information, and entirely utilized for prediction of subsequent motions.

Figure 7:
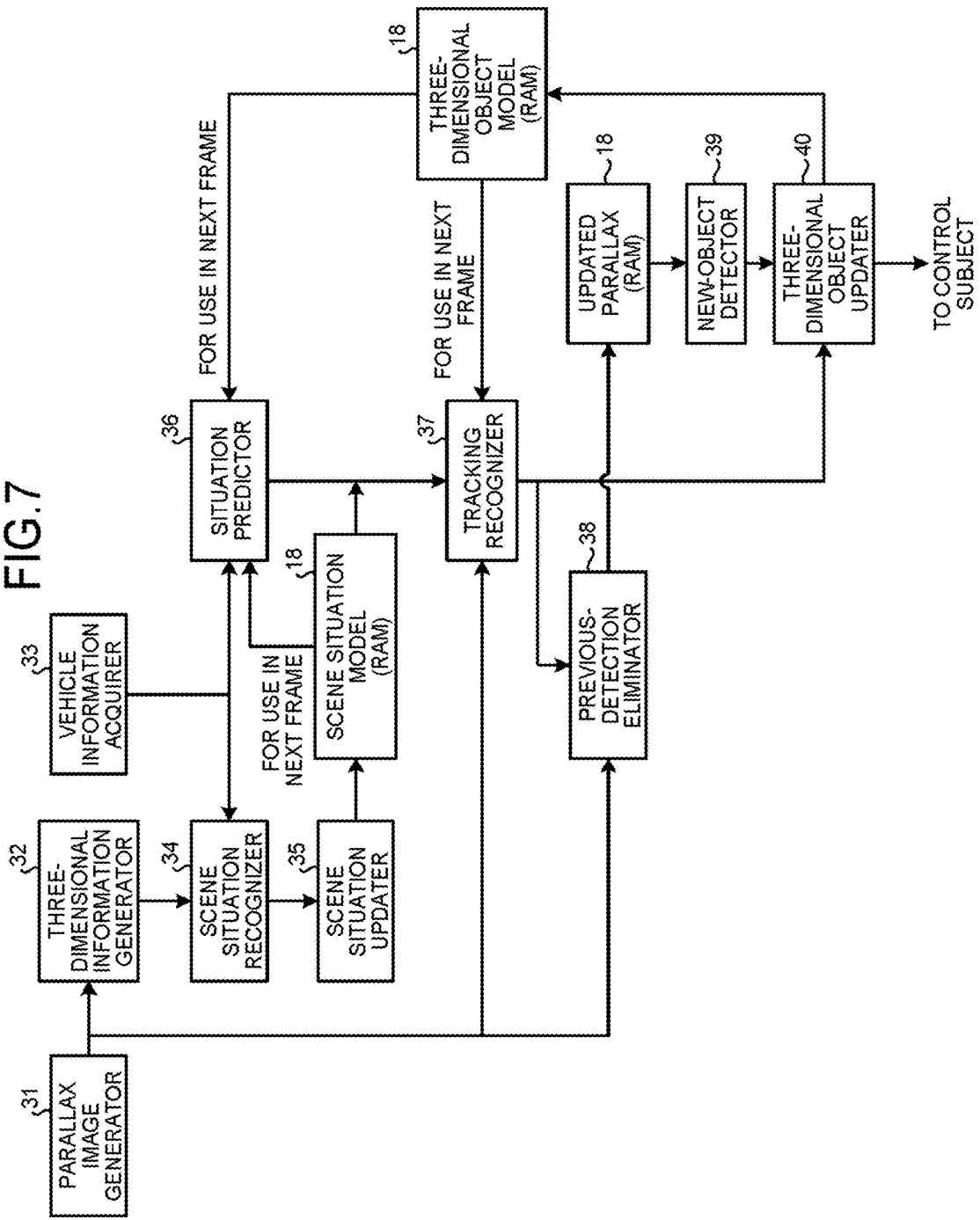
FIG. 7 is a functional block diagram of the three-dimensional object recognition apparatus of the embodiment.

FIG. 7 illustrates a functional block diagram of functions that are implemented when the CPU 15 of the three-dimensional object recognition apparatus of the first embodiment operates in accordance with the three-dimensional object recognition program. As illustrated in FIG. 7, the CPU 15 functions as a three-dimensional information generator 32, a vehicle information (CAN information) acquirer 33, a scene situation recognizer 34, and a scene situation updater 35. The CPU 15 further functions as a situation predictor 36, a tracking recognizer 37, a previous-detection eliminator 38, a new-object detector 39, and a three-dimensional object updater 40. Note that the FPGA 16 functions as a parallax image generator 31 illustrated in FIG. 7, and generates parallax images (distance images) as described above. These units 31 to 40 may be entirely implemented with software or may be entirely or partially implemented with hardware.

In the three-dimensional object recognition apparatus as described above, when captured images of, for example, a vehicle traveling ahead and scenery in the foreground that have been captured by the camera units 1a and 1b of the stereo camera unit 1 are stored in the RAM 18, the parallax image generator 31 generates what is called a parallax image by converting parallax between the captured images into brightness, and then stores the parallax image in the RAM 18. The three-dimensional information generator 32 generates, from the parallax image stored in the RAM 18, a three-dimensional image that contains information on a three-dimensional space, and stores the three-dimensional image in the RAM 18.

Note that, in this example, a parallax image generated from captured images of the respective camera units 1a and 1b is used as a distance image. For use as an alternative to a parallax image, distance information indicating a distance to each three-dimensional object may be calculated from a period between when a radar wave is transmitted out to the three-dimensional object and when the radar wave is received after being reflected by the three-dimensional object, although this is merely one example. In this specification, an image in which distance information and image information are associated with each other, including a parallax image, is defined as a distance image.

The scene situation recognizer 34 recognizes the speed, the moving direction, and the like of the user's vehicle from the CAN information acquired by the vehicle information acquirer 33 and indicating the current state of the vehicle (the internal situation indicating the operational state of equipment set as a control subject). The scene situation recognizer 34 recognizes the external situation regarding a background object, a road, a vehicle traveling ahead, a person or the like that are included in a three-dimensional image. The scene situation updater 35 generates the scene situation model explained with FIG. 5, which indicates the current situation, from a recognition result of the scene situation recognizer 34 and then stores the scene situation model in the RAM 18. Such recognition of the current situation is performed with respect to each frame of images. The scene situation updater 35 updates the scene situation model in the RAM 18 each time recognition of the current situation is performed.

Next, the situation predictor 36 generates prediction information by predicting the states of the user's vehicle, a person, a vehicle traveling ahead, a wall located alongside, a road and the like by use of: the CAN information indicating the current state of the vehicle; the scene situation model updated on the RAM 18 and indicating the current situation; and the three-dimensional object model (refer to FIG. 6) indicating the current states of new three-dimensional objects such as a person and a vehicle that are not found among currently recognized three-dimensional objects.

The tracking recognizer 37 recognizes three-dimensional objects in a current parallax image stored in the RAM 18, and recognizes, as recognition targets, several three-dimensional objects in descending order of priority. The tracking recognizer 37 treats a recognition target found immediately ahead of the user's vehicle as a recognition target positioned high in the order of priority. The tracking recognizer 37 treats a recognition target found at an edge as a recognition target positioned low in the order of priority.

Additionally, the tracking recognizer 37 changes values of the threshold used in a method for recognition of recognition targets or applies a different recognition method, based on: the scene situation model stored in the RAM 18 and indicating the current situation; the three-dimensional object model; and a prediction result from the situation predictor 36. For example, a recognition target that has been stably recognized is determined to be high in the order of priority, and a simple algorithm with a lower threshold is applied so that the recognition target can be recognized even when a certain luminance change has occurred. Furthermore, even when the shape of a recognition target (the vehicle traveling ahead) changes or has become difficult to recognize because of a curve of a road or the like, proactive recognition is performed as long as such a change is a predicted change.

The tracking recognizer 37 recognizes recognition targets while allowing changes to or selecting from among a plurality of algorithms or weights of an algorithm on the basis of situation determination and prediction. This recognition makes it possible to stably continuously recognize (track) a recognition target the state of which has changed from recognized to unrecognized or vice versa from one frame to another with a subtle change in luminance. This recognition also makes it possible to stably continuously recognize a vehicle traveling ahead even after the vehicle becomes hardly recognizable by traveling on a curve of a road and having its shape changed.

Next, the previous-detection eliminator 38 eliminates, from among objects in the current parallax image stored in the RAM 18, a recognition target being tracked by the tracking recognizer 37, and stores the thus obtained parallax image as an updated parallax image in the RAM 18.

The new-object detector 39 recognizes a three-dimensional object such as a vehicle or a person in the updated parallax image from which a recognition target being tracked by the tracking recognizer 37 is eliminated, thereby recognizing a new three-dimensional object different from the recognition target currently being tracked by the tracking recognizer 37. The three-dimensional object updater 40 reflects a new three-dimensional object recognized by the new-object detector 39 in the three-dimensional object model, which is illustrated in FIG. 6, stored in the RAM 18, thereby updating the three-dimensional object model stored in the RAM 18. The situation predictor 36 predicts the situation using the three-dimensional object model thus updated with a new three-dimensional object reflected therein.

The three-dimensional object updater 40 feeds recognition results of recognition targets from the tracking recognizer 37 to external equipment set as a control subject such as an automatic braking system or an automatic speed control system. In this manner, the vehicle is automatically braked in accordance with recognition results of recognition targets or the traveling speed of the vehicle is automatically adjusted.

The following describes the detail of a prediction process in the situation predictor 36. The situation predictor 36 calculates a "recognition-target object position", a "recognition-target object shape change rate", and a "recognition-target object blockage rate". The tracking recognizer 37 uses results of these calculations as situation prediction results of the recognition targets.

Firstly, the recognition-target object position can be calculated by use of a Kalman filter or a Bayesian filter. Secondly, a position $x_f(t)$ of the user's vehicle, a speed $v_f(t)$ of the user's vehicle, a position $x_p(t)$ of a vehicle traveling ahead and a speed $v_p(t)$ of the vehicle traveling ahead, at a time t are calculated using the following formulas:

$$x_f(t)=x_f(t-1)+v_f t+((a_f t^2)/2),$$

$$v_f(t)=v_f(t-1)+a_f t,$$

$$x_p(t)=x_p(t-1)+v_p t+((a_p t^2)/2), \text{ and}$$

$$v_p(t)=v_p(t-1)+a_p t.$$

The position of a recognition-target object relative to the user's vehicle in real coordinates can be expressed as "$x_p(t)-x_f(t)$". When a three-dimensionally defined point corresponding to the position of the recognition-target object relative to the user's vehicle in real coordinates, which has been calculated as "$x_p(t)-x_f(t)$", is mapped as "$(X_p,Y_p,Z_p)$", the position of the recognition-target object in a captured image at the time t is calculated using, for example, the following formulas:

$$x_{predict}=f(X_p/Z_p), \text{ and}$$

$$y_{predict}=f(Y_p/Z_p)$$

Here, if "$x_{predict},y_{predict}$" is assumed as the centroid position of the recognition-target object in the captured image, an area $P_{area}$ of a region for the prediction process in this target-object recognition is determined, using the size "$x_{width},y_{height}$" of the recognition-target object, to be as expressed by, for example, the following formula while being centered at the centroid position and covering the entirety of the object.

$$P_{area}=(x_{width}+\omega_1/R+\omega_2 E)\times(y_{height}+\omega_1/R+\omega_2 E)$$

In this formula, "R" represents the reliability of a recognition result up to a time t−1 (high reliability when a target has been stably recognized), "E" represents a recognition error, and "$\omega_1, \omega_2$" are weights for how much these terms are reflected. In this first embodiment, the same set of weights is applied to both of the x direction and the y direction each given as one example. Different sets of weights may be applied to the x direction and the y direction, respectively. When the reliability is low or when the recognition error is large, recognition is performed for a larger range. Note that, as the reliability, the number of frames through which a target has been continuously recognized may be used.

Next, the recognition-target object shape change rate "$\Delta_{obj}$" is, for example, calculated according to the following formula in such a manner that: a road curvature ($C(X_P,Y_P,Z_P)$) and a slope rate ($S(X_P,Y_P,Z_P)$) at this position are calculated, based on "$X_P,Y_P,Z_P$", from the moving direction ($X_P,Y_P,Z_P$) of the three-dimensional object explained with FIG. 6 and the road information explained with FIG. 5; and then these road curvature and slope rate are multiplied with each other. Note that a method disclosed in Japanese Patent Application Laid-open No. 2004-102421 and Japanese Patent Application Laid-open No. 2014-006882, or another publicly-known method is used as appropriate for calculation of the road curvature and the slope.

$$\Delta_{obj}=C((X_P+X_v),(Y_P+Y_v),(Z_P+Z_v))\times S((X_P+X_v),(Y_P+Y_v),(Z_P+Z_v))$$

When this calculation is implemented, weights may be attached to "C" and "S", and it is desirable that "C" and "S" be normalized.

Similarly, the recognition-target object blockage rate "$H_{obj}$" is calculated, for example, in such a manner that: positional relations with background objects and other three-dimensional objects near to these positions are calculated, based on "$X_P,Y_P,Z_P$" and "$X_v,Y_v,Z_v$", from background information explained with FIG. 5; and it is predicted from a track of motion of a recognition-target object whether any background object is to be positioned nearer than the recognition-target object. This prediction can be expressed by the following function.

$$H_{obj}=\text{Func}(\Sigma D_{bo},\Sigma D_{oo},ER_{info})$$

Here, "$D_{bo}$" is a variable that indicates a distance to the background object, calculated as a difference in positional relation with a background object, based on "$(X_P,Y_P,Z_P), (X_v,Y_v,Z_v)$". The value of "$D_{bo}$" is high when the positional relations are overlapped. Here, "$D_{oo}$" is a variable calculated as a difference in positional relation with another three-dimensional object, based on "$(X_P,Y_P,Z_P), (X_v,Y_v,Z_v)$". The value of "$D_{oo}$" is a high value when the positional relations are overlapped.

"$R_{info}$" is the road information (obtained by combining "C" and "S") explained with FIG. 5. Note that $H_{obj}$ is a vector quantity that contains directional information. From which direction and to what extent an object is to be blocked is calculated, and the shape of the object after it is blocked can be therefore specified. In addition to the above calculation, the situation predictor 36 further calculates, based on prediction results, a percentage at which a recognition-target object is blocked by another recognition-target object.

This calculation makes it possible to obtain a shape of a recognition-target object that would be recognizable when the recognition-target object is blocked by another recognition-target object, thereby improving the recognition rates of recognition-target objects. Furthermore, this calculation makes it possible to continuously recognize and track a recognition-target object without having the recognition-target object unrecognized (makes it possible to track a recognition-target object without losing sight of the recognition-target object).

Thus, the situation predictor 36 performs not only position prediction of a recognition-target object, which is used in a conventional tracking technique such as a Kalman filter, but also recognition of a situation, thereby making it possible to calculate the recognition-target object shape change rate and the recognition-target object blockage rate. Therefore, for example, when the recognition-target object shape change rate or the recognition-target object blockage rate is low, a recognition method for recognition targets can be changed to a simple recognition method for proactively recognizing recognition-target objects. Furthermore, when the recognition-target object shape change rate or the recognition-target object blockage rate is high, a recognition method that agrees with the calculated recognition-target object shape change rate or recognition-target object blockage rate is selected for use.

Figure 8:
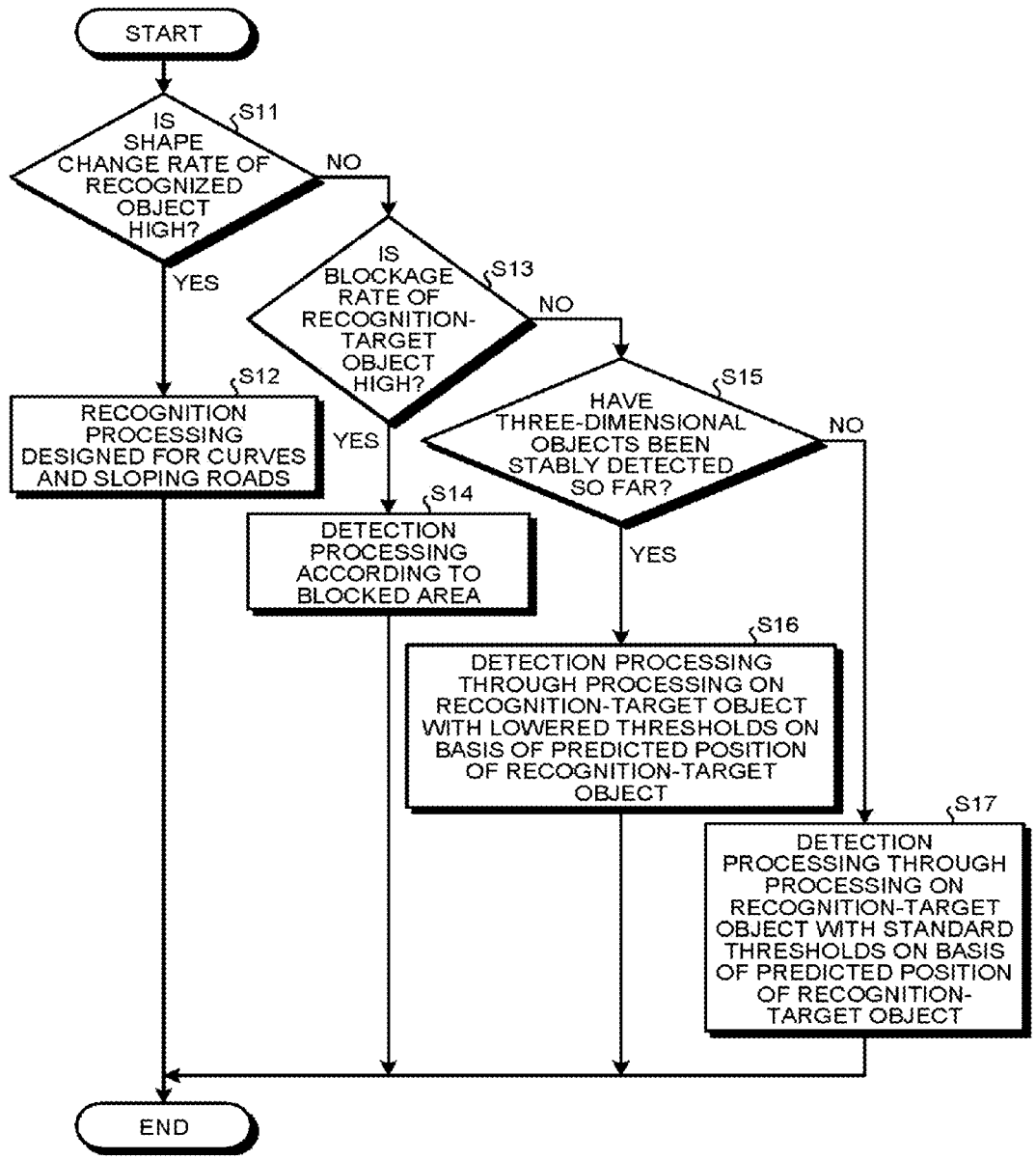
FIG. 8 is a flowchart for explaining operation to change, for example, recognition methods for a recognition target in accordance with a situation prediction result from the three-dimensional object recognition apparatus of the embodiment.

The following refers to a flowchart in FIG. 8, which illustrates a procedure of operation performed by the tracking recognizer 37 for change of recognition methods for recognition targets, change of thresholds, or the like in accordance with a prediction result from the situation predictor 36. The tracking recognizer 37 starts the process of the flowchart in FIG. 8 from step S11 upon completion of the calculation of the above-described recognition-target object positions, recognition-target object shape change rates, and recognition-target object blockage rates by the situation predictor 36. The recognition-target object positions, the recognition-target object shape change rates, and the recognition-target object blockage rates are calculated with respect to each frame. The tracking recognizer 37 therefore repeats execution of the operation described in the flowchart in FIG. 8 with respect to each frame.

At step S11, the tracking recognizer 37 determines whether the recognition-target object shape change rate calculated by the situation predictor 36 is higher than a predetermined threshold. When the recognition-target object shape change rate is higher than the threshold, it means that the shape of a recognition target currently being recognized is changed to a large extent. The tracking recognizer 37 therefore moves the process forward to step S12 if the recognition-target object shape change rate is higher than the threshold (Yes at step S11). In this step, for example, when the recognition target is a vehicle traveling ahead, the tracking recognizer 37 selects a recognition method designed for a curve of a road or a sloping road, or performs control so as to change thresholds from the one for a currently applied recognition method to the one designed for a curve of a road or a sloping road. Therefore, the recognition target such as a vehicle traveling ahead can be reliably captured and continuously recognized even when the recognition target such as a vehicle traveling ahead is traveling on a curve of a road or traveling on a sloping road and consequently has a shape changed from a currently-recognized shape thereof.

Next, if it is determined at step S11 that the recognition-target object shape change rate is lower than the predetermined threshold (No at step S11), the tracking recognizer 37 moves the process forward to step S13, where the tracking recognizer 37 determines whether the recognition-target object blockage rate is higher than a predetermined threshold. For example, when the recognition-target object blockage rate of a vehicle traveling ahead set as a current recognition target is higher than the threshold, it means that another three-dimensional object such as a wall or another vehicle exists between the vehicle traveling ahead and the user's vehicle. For this reason, if the recognition-target object blockage rate is higher than the predetermined threshold (Yes at step S13), the process is moved forward to step S14, where a recognition method corresponding to a blocked area of the recognition target is selected, or control is performed so that thresholds may be changed to the one corresponding to the blocked area of the recognition target. This process makes it possible to reliably capture and continuously recognize a vehicle traveling ahead even when the vehicle has disappeared behind some object or disappeared behind another vehicle.

Next, if the recognition-target object blockage rate is lower than the predetermined threshold at step S13 (No at step S13), the tracking recognizer 37 moves the process forward to step S15, where the tracking recognizer 37 determines whether three-dimensional objects have been successfully stably detected. Specifically, the tracking recognizer 37 determines whether three-dimensional objects have been successfully stably detected, by determining whether image shapes (luminance images) or (and) parallax shapes (parallax images) have been successfully detected as substantially unchanging over time. Next, if it is determined that three-dimensional objects have been successfully stably detected (Yes at step S15), the tracking recognizer 37 moves the process forward to step S16; otherwise, if it is determined that three-dimensional objects have not been successfully stably detected (No at step S15), the tracking recognizer 37 moves the process forward to step S17.

Upon moving the process forward to step S16 as a result of determining that three-dimensional objects have been successfully stably detected, the tracking recognizer 37 changes thresholds for use in the recognition method for a recognition target from the currently-used one to another threshold that is lower by a predetermined value. This step makes it possible to more accurately recognize and track a recognition target by using information such as a predicted position of the recognition target.

Upon moving the process forward to step S17 as a result of determining that three-dimensional objects have not been successfully stably detected, the tracking recognizer 37 changes thresholds for use in the recognition-target recognition method to a standard value (initial value). This step is aimed at stably tracking a recognition target through recognition of the recognition target with a standard threshold using information such as a predicted position of the recognition target.

The foregoing explanation of the flowchart in FIG. 8 assumes that the process according to the recognized-object shape change rate and the process according to the recognized-object blockage rate are separately performed. However, these processes may be integrally performed, or an integral determination process that includes these processes may be performed first.

Figure 9:
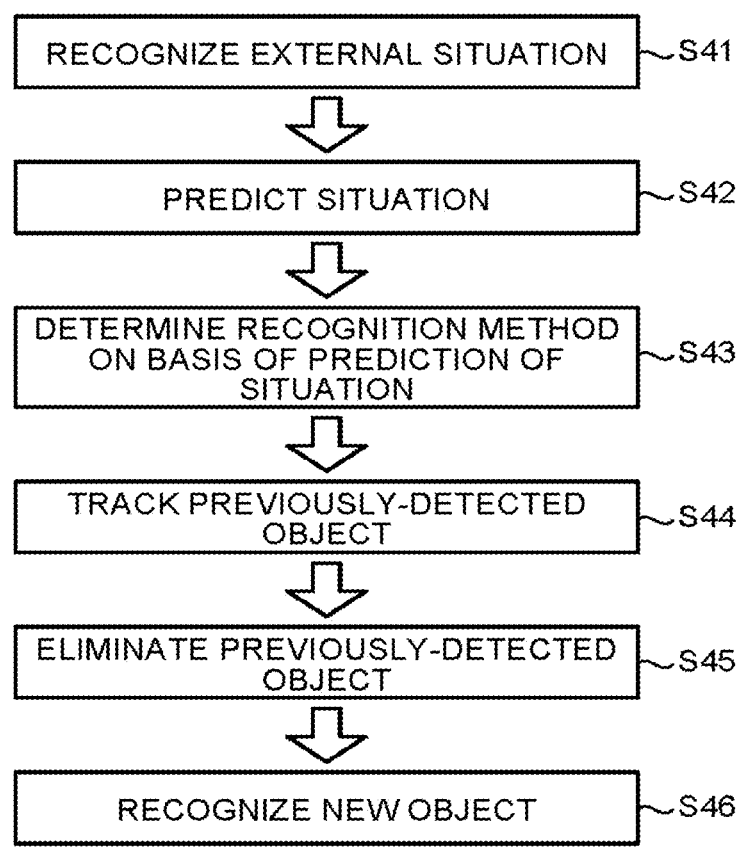
FIG. 9 is a flowchart for explaining the entire procedure of the operation to change, for example, recognition methods for a recognition target in accordance with a situation prediction result from the three-dimensional object recognition apparatus of the embodiment.

The following describes again the entirety of the above-described process procedure of FIG. 8 with reference to FIG. 9. More specifically, in the first place, the CPU 15 of the three-dimensional object recognition apparatus of the first embodiment recognizes the external situation as illustrated at step S41 of FIG. 9 when operating in accordance with the three-dimensional object recognition program. In one example, the CPU 15 recognizes the external situation according to the recognized-object shape change rate explained with step S11 above, the recognized-object blockage rate explained with step S13, the detection situation of three-dimensional objects explained with step S15, and the like.

Subsequently, at step S42, the CPU 15 predicts the situation on the basis of the recognized external situation. Specifically, as explained with step S11 and step S12, with the recognition-target object shape change rate being higher than the threshold, it can be inferred that the recognition target such as a vehicle traveling ahead is predicted to be traveling on a curve of a road or traveling on a sloping road. Additionally, with the recognition-target object blockage rate being higher than the threshold, it can be inferred that another three-dimensional object such as a wall or another vehicle exists between the recognition target such as a vehicle traveling ahead and the user's vehicle.

Subsequently, at step S43, a recognition method is determined from the predicted situation. For example, as explained with step S11 and step S12, if the recognition-target object shape change rate is higher than the threshold, the CPU 15 selects a recognition method designed for a curve of a road or a sloping road. Alternatively, the CPU 15 changes thresholds for a recognition method currently in use to a threshold designed for a curve of a road or a sloping road. The CPU 15 then tracks the recognition target such as the vehicle traveling ahead, which is a previously-detected object, using the recognition method thus selected or the threshold after the change, at step S44. Therefore, the recognition target such as a vehicle traveling ahead can be reliably captured and continuously recognized even when the recognition target such as a vehicle traveling ahead is traveling on a curve of a road or traveling on a sloping road and consequently has a shape changed from a currently-recognized shape thereof.

For example, as explained with step S13 and step S14, if the recognition-target object blockage rate of the vehicle traveling ahead is higher than the threshold, the CPU 15 selects a recognition method according to a blocked area of the recognition target. Alternatively, the CPU 15 changes thresholds for a recognition method currently in use to a threshold according to the blocked area of the recognition target. The CPU 15 then tracks the recognition target such as the vehicle traveling ahead, which is a previously-detected object, using the recognition method thus selected or the threshold after the change, at step S44. This process makes it possible to reliably capture and continuously recognize a vehicle traveling ahead even when the vehicle has disappeared behind some object or disappeared behind another vehicle. The three-dimensional object recognition apparatus of the first embodiment thus uses different recognition methods or different thresholds according to a future external situation based on the external situation recognized in an imaged region.

In a predetermined frame of imaging, the CPU 15 tracks a previously-detected object recognized in the preceding frame (step S44), and, then, after eliminating the previously-detected object at step S45, recognizes a new object at step S46. Specifically, as explained with reference to FIG. 7, the previous-detection eliminator 38 eliminates, from among objects in the current parallax image stored in the RAM 18, a recognition target being tracked by the tracking recognizer 37 (step S45), and stores the thus obtained parallax image as an updated parallax image in the RAM 18.

The new-object detector 39 recognizes a three-dimensional object such as a vehicle or a person in the updated parallax image from which a recognition target being tracked by the tracking recognizer 37 is eliminated, thereby recognizing a new three-dimensional object different from the recognition target currently being tracked by the tracking recognizer 37 (step S46). The three-dimensional object updater 40 reflects a new three-dimensional object recognized by the new-object detector 39 in the three-dimensional object model, which is illustrated in FIG. 6, stored in the RAM 18, thereby updating the three-dimensional object model stored in the RAM 18. The situation predictor 36 predicts the situation using the three-dimensional object model thus updated with a new three-dimensional object reflected therein. According to this process, while a previously-detected object that has been stably recognized can be continuously tracked with high accuracy, a new object can be recognized with improved accuracy.

Figure 10A:
FIGS. 10A and 10B are views illustrating one example of a screen showing tracking of recognition targets.
Figure 10B:
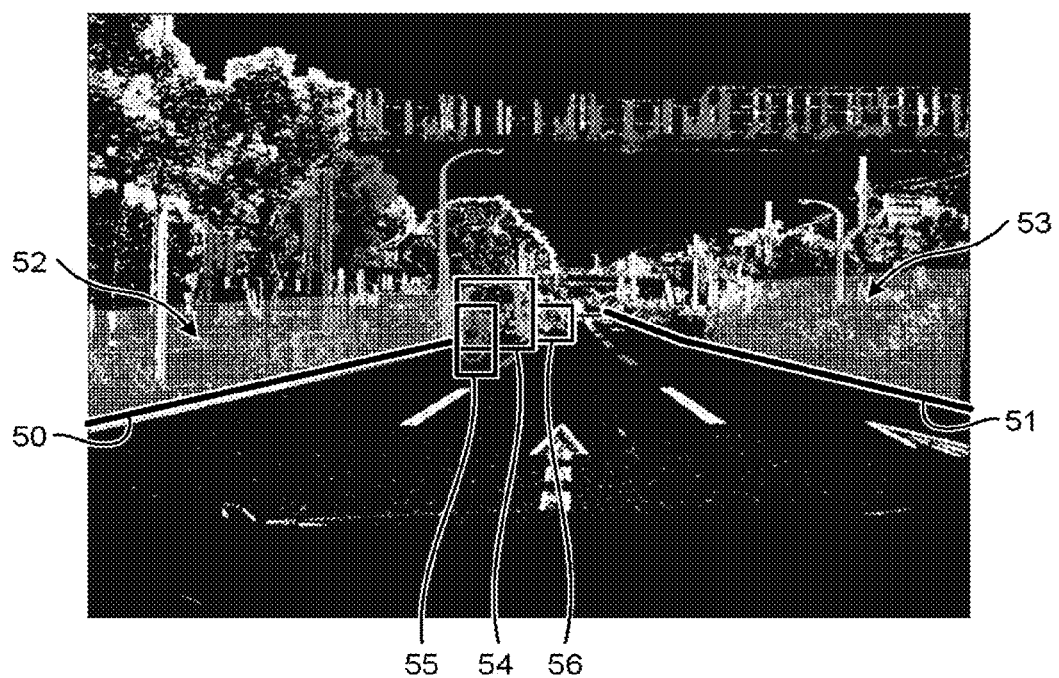

FIGS. 10A and 10B are views illustrating one example of a screen showing tracking of recognition targets. FIG. 10A is a view illustrating a stereo image captured by the stereo camera unit 1. FIG. 10B is a view illustrating a parallax image generated by the parallax image generator 31. Referring to the parallax image illustrated in FIG. 10B while referring to the normal image-capturing image illustrated in FIG. 10A makes it understood that the scene situation recognizer 34 recognizes edge stones 50 and 51, thereby recognizing that a road on which the user's vehicle is traveling is between the edge stones 50 and 51. The scene situation recognizer 34 also recognizes that there are wall parts 52 and 53 formed along the edge stones 50 and 51. The scene situation recognizer 34 further recognizes that there are vehicles traveling ahead 54 to 56, which are traveling ahead of the user's vehicle, on the road. As can be seen from FIG. 10A, the vehicle traveling ahead 54 is a passenger bus. Additionally, the vehicle traveling ahead 55, which is traveling between the passenger bus and the user's vehicle, is a motorcycle. The vehicle traveling ahead 56, which is traveling ahead of the vehicle traveling ahead 54 illustrated as a passenger bus in this example, is a light car.

Under such a situation, it has been conventionally difficult to stably recognize and track a vehicle traveling far, such as the light car referred to as the vehicle traveling ahead 56, because such a vehicle repeats alternately becoming recognized and unrecognized. In contrast, in the case of the three-dimensional object recognition apparatus of the first embodiment, using the above-described prediction results makes it possible to stably continuously recognize (track) the vehicle. Furthermore, in the case of this example, using the above-described prediction results, which are based on calculation of the recognition-target object blockage rate and the like, makes it possible to stably continuously recognize (track) the passenger bus (vehicle traveling ahead 54) blocked by the vehicle traveling ahead 55 illustrated as a motorcycle while grasping the motion of the motorcycle and the motion of the passenger bus.

As the above description makes clear, the three-dimensional object recognition apparatus of the first embodiment recognizes circumstances such as what situation an object set as a control subject, such as the user's vehicle, is currently under, whether there is any three-dimensional object previously detected, and how each previously detected three-dimensional object is under the current situation. More specifically, the three-dimensional object recognition apparatus recognizes the current situation and predicts a future situation at the same time, and then recognizes a recognition target while selectively using recognition methods in accordance with the prediction results or recognizes a recognition target while changing thresholds for use in a recognition method in accordance with the prediction results. This recognition makes it possible to stably continuously recognize a recognition target that repeats alternately becoming recognized and unrecognized or vice versa from one frame to another with a subtle change in luminance. This recognition also makes it possible to stably continuously recognize a vehicle traveling ahead even after the vehicle becomes hardly recognizable by traveling on a curve of a road and having its shape changed, or by being behind the far side of an object such as a wall.

Second Embodiment

The following describes another three-dimensional object recognition apparatus as a second embodiment. In the first place, the three-dimensional object recognition apparatus of the second embodiment uses a "background model (background information (stationary object) model) in which stationary objects in the background of moving objects are modeled", a "road (traveled surface) model" and "recognition histories of the respective moving objects" to grasp information such as what scene situation each object set as a control subject is currently under, whether there is any object previously detected, and what state each previously-detected object is under the current scene situation. Then, the three-dimensional object recognition apparatus detects moving objects (recognition targets) while changing detection methods in accordance with the grasped circumstances.

More specifically, the three-dimensional object recognition apparatus of the second embodiment uses a modeled environment in recognizing a scene situation for detecting three-dimensional objects, and grasps three-dimensional positional relations between imaged objects. The three-dimensional object recognition apparatus then recognizes objects at present from histories of temporal changes of three-dimensional positional relations. Note that the term "situation model" hereinafter refers to the entire information on an imaging environment expressed as pieces of information such as "how stably moving objects set as recognition targets have been recognized", "positional relations between moving objects set as recognition targets and the background model", and "positional relations between moving objects set as recognition targets and the road model".

Figure 11:
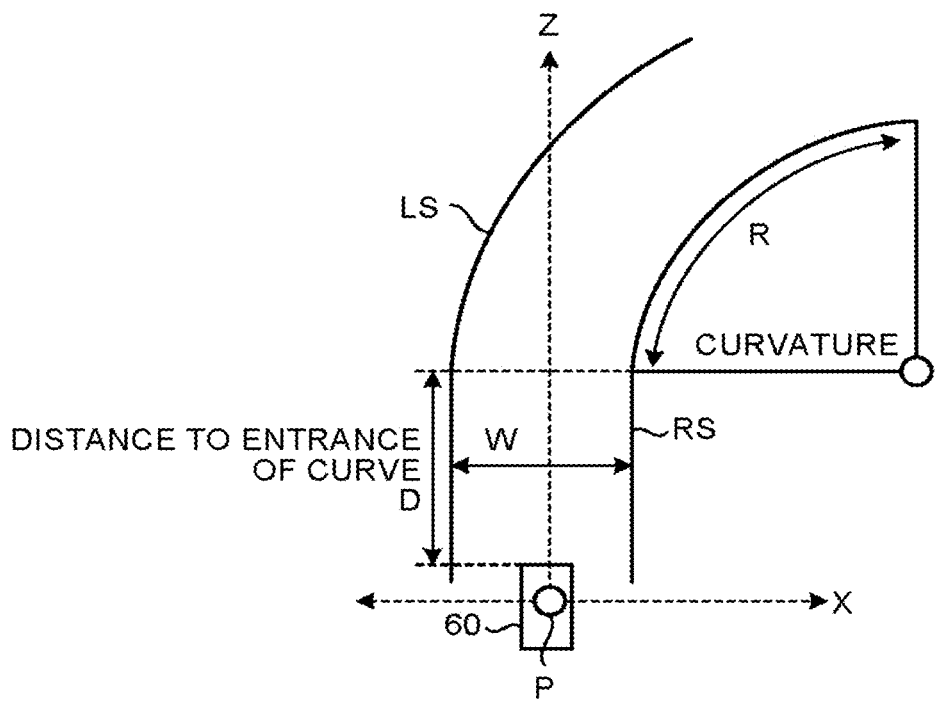
FIG. 11 is a diagram illustrating one example of a road situation model.

FIG. 11 illustrates one example of a road situation model (traveled-surface situation model). A road herein refers to a more or less irregular, traveled surface on which moving objects such as vehicles and persons moves. In the road situation model, pieces of recognition information such as a "road width", the "number of lanes", the "opposing lane position", the "user's vehicle lane position", "curve information", and "road surface sloping" are set. The "road width" is a road width W of a road on which a user's vehicle 60 is traveling. The "number of lanes" is the number of lanes of the road on which the user's vehicle 60 is traveling. The "opposing lane position" is the position of a lane in which oncoming vehicles are traveling in the direction opposite to the traveling direction of the user's vehicle 60. The "user's vehicle lane position" is a position P at which the user's vehicle 60 is currently traveling. The "curve information" includes a distance D to the entrance of a curve and the curvature R of the curve.

Figure 12:
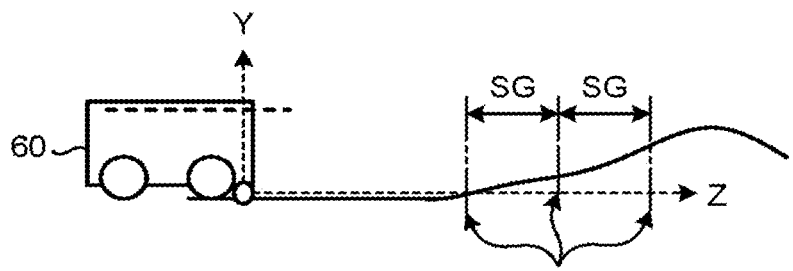
FIG. 12 is a diagram for explaining parameters of an approximate curve for sloping at each of the right and left road edges in the road situation model.

The curve information is not needed to be very highly accurate because, when a change in orientation of a recognition target such as a vehicle traveling ahead matters, it is necessary only to detect the possibility of a change in the orientation from the relation between the vehicle and the user's vehicle. Additionally, in the example of FIG. 11, sloping information of the road is implemented in addition to the curve information. As illustrated in FIG. 12, the "road surface sloping" is an approximate curve parameter calculated for each segment SG obtained by dividing a road in the traveling direction of the user's vehicle 60 in accordance with distances from the user's vehicle 60. These approximate curve parameters are calculated for the right and left road edges LS and RS illustrated in FIG. 11. For example, when a vehicle traveling ahead set as a recognition target partially hides, the sloping information is utilized in recognizing a situation as to whether such situation with the vehicle traveling ahead partially hiding is due to, for example, downward sloping.

Otherwise, when there are two or more lanes in the traveling direction of the user's vehicle, there is a possibility that a vehicle traveling ahead that has been recognized is to change lanes to an adjacent lane. In this case, there are a possibility that a change occurs in orientation of the vehicle traveling ahead and a possibility that the vehicle traveling ahead set as a recognition target partially hides as a result of changing its traveling position by changing lanes to slip in front of another vehicle traveling in the adjacent lane. Pieces of lane information such as the "user's lane position" and the "number of lanes" are used for recognizing such situations.

Limit values for these pieces of information are determined based on, for example, road rules in a traveling environment. Additionally, three-dimensional information obtained from parallax is used for detecting and applying the substance of the road model in an actually imaged environment.

Figure 13A:
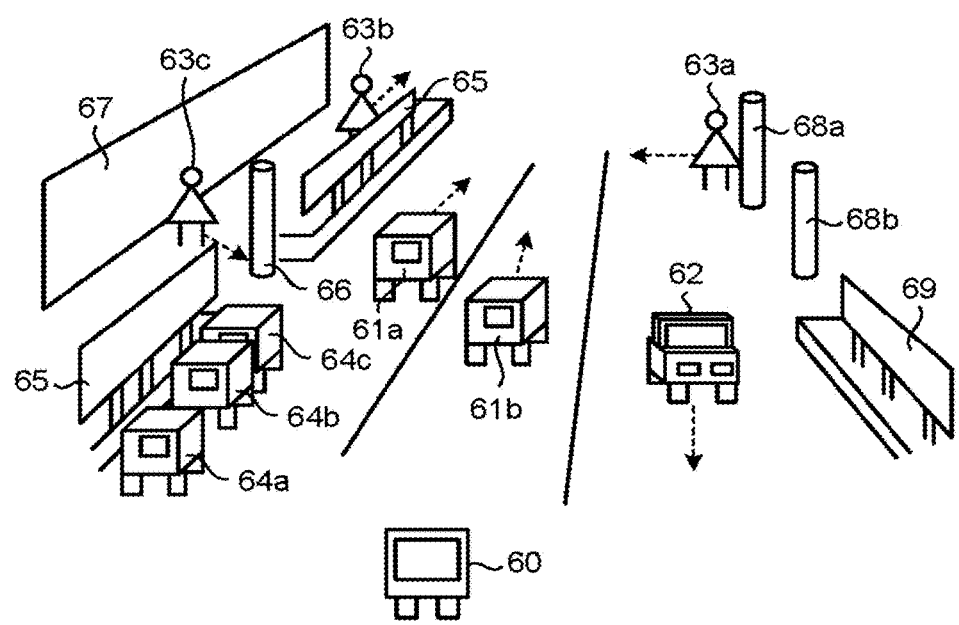
FIGS. 13A and 13B are diagrams illustrating one example of a background model.
Figure 13B:
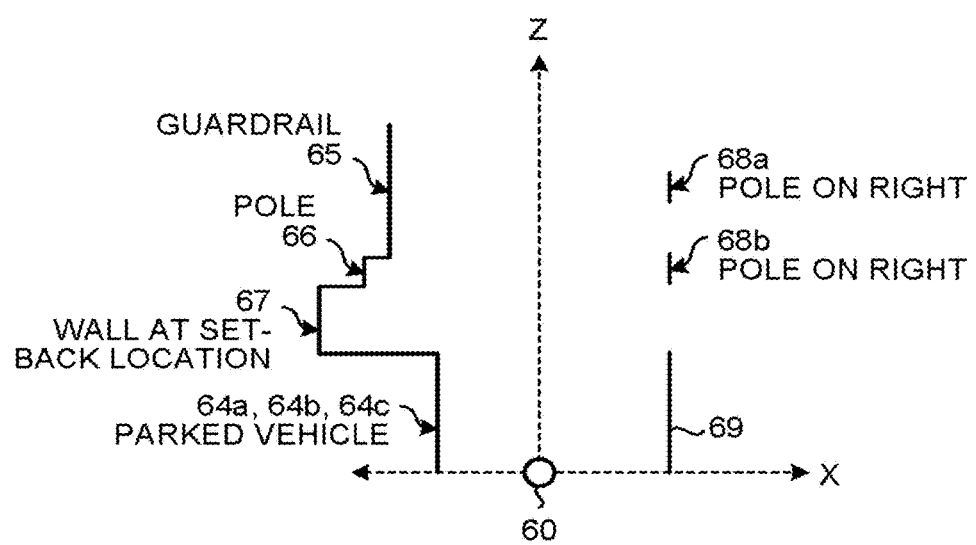

The following refers to FIGS. 13A and 13B, which are diagrams illustrating one example of the background model. For the background model in this example, a stationary-object boundary region is described, which represents a boundary between a region in which the user's vehicle can move and a region in which user's vehicle has difficulty in moving. Specifically, as illustrated in FIG. 13A, search is performed radially with the user's vehicle 60 at the center in an aerial, overhead view of the position of the user's vehicle 60. Based on conversion using a road height in the nearest neighborhood from the position of the user's vehicle 60, the position of a stationary object having a height equal to or greater than a predetermined height threshold is set as a stationary-object boundary region. A stationary object means an object that is stationary when imaging is performed by the stereo camera unit 1 provided to the user's vehicle 60. For this reason, the stationary object is an object that is stationary during imaging such as a wall, a utility pole, a guardrail, or a parked vehicle. For determination as to whether an object is a stationary object, such information as the vehicle information in the form of CAN and history information of the background model can be utilized.

More specifically, FIG. 13A is an overhead view of the moving direction of the user's vehicle 60 with the user's vehicle 60 at the center. Arrows in FIG. 13A indicate directions in which moving objects are moving. In this example, two vehicles traveling ahead 61a and 61b, one oncoming vehicle 62, and persons 63a, 63b, and 63c are illustrated as moving objects and are moving in the directions indicated by the arrows. These objects are not reflected in the background model because they are moving objects. These objects are found from three-dimensional positions detected from parallax images.

In contrast, parked vehicles 64a to 64c, guardrails 65, a bollard pole 66, and a wall 67 at the inner edge of a sidewalk, on a road for vehicles traveling in the same direction as the user's vehicle 60, are set as stationary objects. Similarly, bollard poles 68a and 68b and a guardrail 69, on a road for vehicles that travel in the direction opposite to the traveling direction of the user's vehicle 60 are set as stationary objects.

Mapping such stationary-object boundary regions onto an X-Z plane results in FIG. 13B. As can be seen from FIG. 13B, as a result of mapping stationary-object boundary regions onto the X-Z plane, segments corresponding to the heights of stationary objects appear at the positions of the respective stationary objects.

Figure 14:
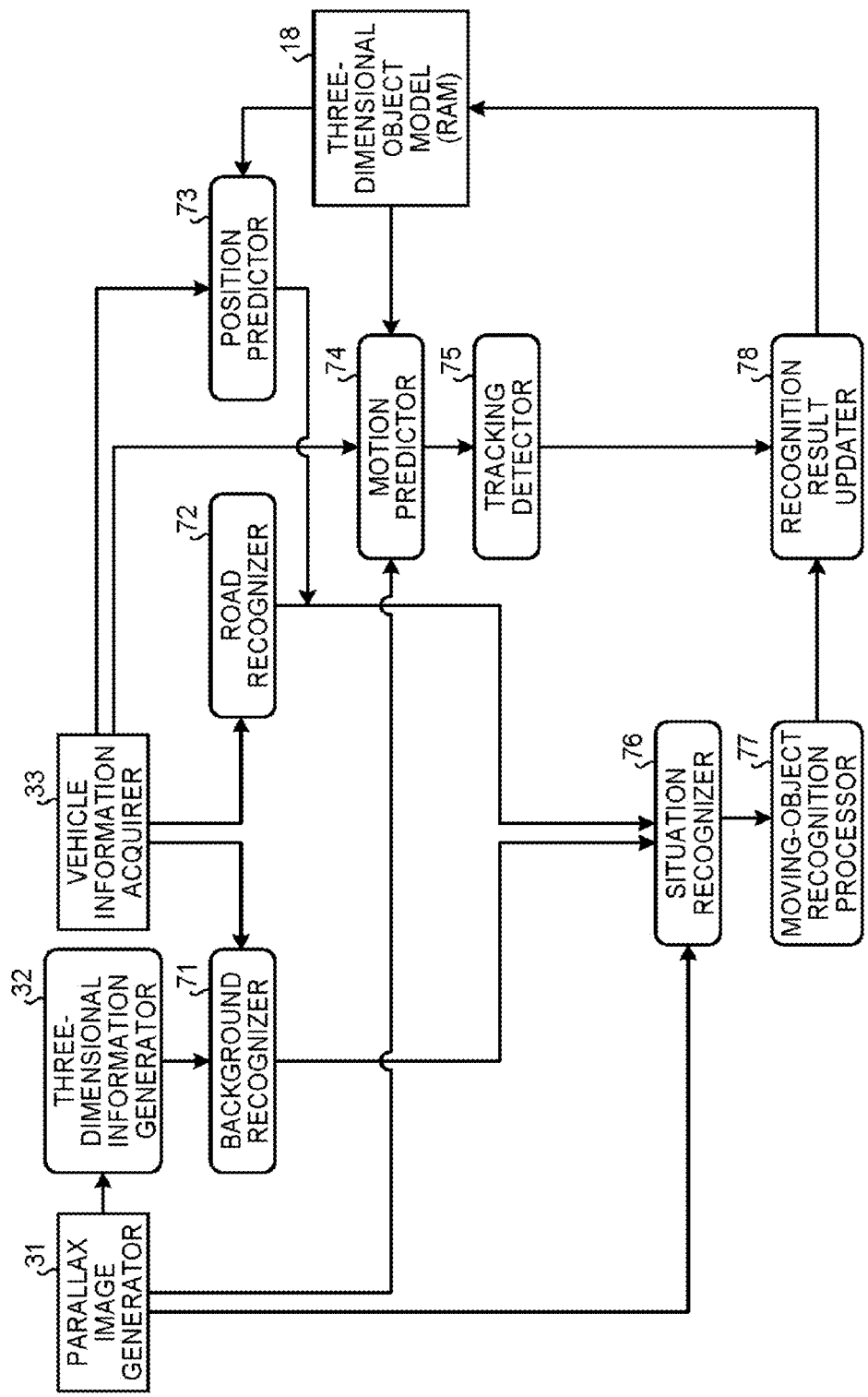
FIG. 14 is a functional block diagram of a three-dimensional object recognition apparatus of a second embodiment.

The three-dimensional object recognition apparatus of the second embodiment recognizes a situation by using a background model and the above-described road situation model and updates a recognition result of moving object for which a recognition history has been stored. The background model is represented in the form of height information on stationary-object boundary regions and positions of edges of stationary object boundaries. FIG. 14 illustrates a functional block diagram corresponding to such processes. Functions in FIG. 14 are implemented when the CPU 15 of the three-dimensional object recognition apparatus of the second embodiment operates in accordance with a three-dimensional object recognition program. The same reference signs are assigned to the same functions as those described in the first embodiment among functions illustrated in FIG. 14, and detailed descriptions thereof are omitted.

As illustrated in FIG. 14, the three-dimensional object recognition apparatus of the second embodiment includes the parallax image generator 31, the three-dimensional information generator 32, the vehicle information acquirer 33, a background recognizer 71, and a road recognizer 72, and a position predictor 73, and a motion predictor 74. The three-dimensional object recognition apparatus further includes a tracking detector 75, a situation recognizer 76, a moving-object recognition processor 77, and a recognition result updater 78. The parallax image generator 31 serves as one example of a distance image acquirer. In addition, an electronic control unit (ECU) 95 to be described later with reference to either FIG. 21 or FIG. 30 serves as one example of a controller. Although the following description assumes that units from the parallax image generator 31 to the vehicle information acquirer 33, and from the background recognizer 71 to the recognition result updater 78 are implemented with software, all or some of these units may be implemented with hardware.

In the thus configured three-dimensional object recognition apparatus, the recognition result updater 78 updates, in accordance with tracking results of the moving objects detected by the motion predictor 74 and the tracking detector 75, recognition results for moving objects, which have been stored in the RAM 18. The motion predictor 74 cross-checks histories of recognition results for moving objects stored in the RAM 18, the road situation model detected by the road recognizer 72 as explained with FIG. 11 and FIG. 12, and the background model detected by the background recognizer 71 as explained with FIGS. 13A and 13B, and predicts how the moving objects are to appear. The tracking detector 75 changes recognition methods for use in tracking of moving objects in accordance with prediction results from the motion predictor 74.

Specifically, for example, in the case of a detected moving object the moving situation of which is unaffected by the current situation represented by the background model and the road situation model, as with an object such as a vehicle traveling ahead on a straight road, only a distance to the moving object changes without a change in how the moving object appears. In this case, prediction results from the motion predictor 74 are stable. In one example, the tracking detector 75 is configured to use histories of recognition results stored in the RAM 18 to perform a matching process of parallax shape features of moving objects between frames, thereby detecting and tracking motions of the respective moving objects. The tracking detector 75 lowers a threshold for use in the matching process of histories of recognition results when there is a stably detected history for a moving object and it is not predicted from the background model and the road situation model that the moving object is to hide or to change in orientation. Thus, a moving object that has been stably detected can be more stably detected. Additionally, when there is a subtle error in parallax information due to such factors as a signal noise (SN) ratio of the CMOS sensor in the stereo camera unit 1, stable detection of moving objects is enabled with this error canceled.

On the other hand, for example, when a moving object travels on a curving road and changes in orientation, thereby making it difficult for the tracking detector 75 to track the moving object, the situation recognizer 76 recognizes again the current situation of the moving object using the background model, the road situation model, and the recognition history for the moving object. The tracking detector 75 then changes methods for moving-object recognition processing to a method for moving-object recognition processing that is adapted to changes in orientation, in accordance with the current situation of the moving object that has been recognized again. More specifically, in this case, the moving-object recognition processor 77 recognizes, as a target, a moving object found with a change in orientation from the current situation of the moving object that has been recognized again. The recognition result updater 78 updates the recognition results on the RAM 18. Furthermore, the position predictor 73 and the motion predictor 74 use recognition histories stored in the RAM 18 to continue recognition of the moving object recognized as a target. Thus, the tracking detector 75 can track the motion of a moving object found with a change in orientation and continue recognition thereof.

Furthermore, when the situation recognizer 76 recognizes that the positional relation between a moving object set as a recognition target and an adjacent object indicates a possibility that the moving object set as a recognition target is to hide behind the adjacent object, the tracking detector 75 changes methods for recognition processing on moving objects to a recognition processing method adapted to hiding of moving objects. More specifically, in this case, the tracking detector 75 uses recognition histories in the RAM 18 to continue recognition of a moving object set as a target even when the moving object set as a target partially hides. Thus, the tracking detector 75 can track the motion of a moving object found as hiding and continue recognition of a moving object set as a target.

Figure 15A:
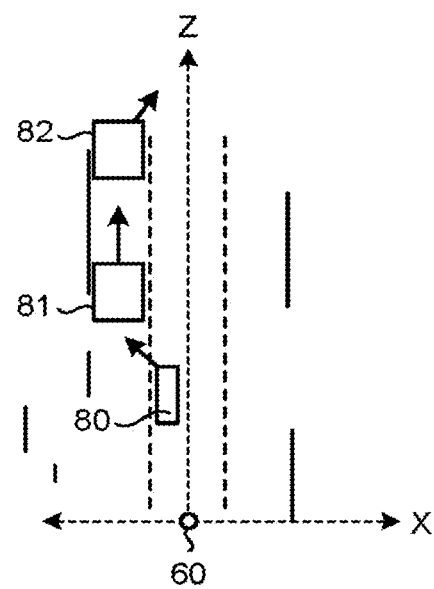
FIGS. 15A and 15B are diagrams for explaining one example of operation performed by the three-dimensional object recognition apparatus of the second embodiment to detect a moving object.
Figure 15B:
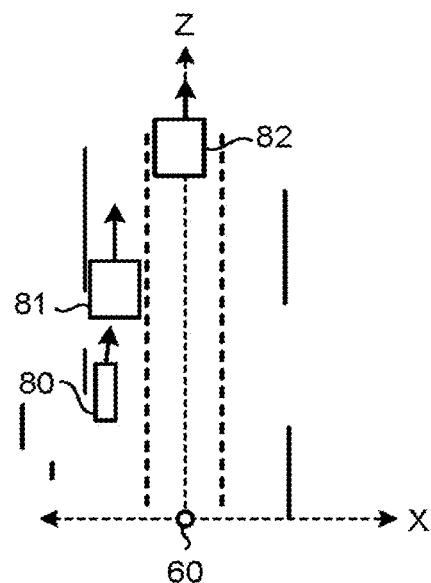

For example, FIGS. 15A and 15B are diagrams illustrating a situation where a motorcycle 80, a first vehicle traveling ahead 81, and a second vehicle traveling ahead 82 are traveling ahead of the user's vehicle 60. More specifically, FIGS. 15A and 15B are diagrams illustrating a situation where, while the motorcycle 80 changes lanes and consequently overlaps the first vehicle traveling ahead 81, the second vehicle traveling ahead 82, which has been hiding behind the first vehicle traveling ahead 81, changes lanes and consequently appears from behind the first vehicle traveling ahead 81. In such a situation, it has been conventionally difficult to detect the second vehicle traveling ahead 82 when it is hiding behind the first vehicle traveling ahead 81, and the motorcycle 80 when it overlaps the first vehicle traveling ahead 81.

However, the three-dimensional object recognition apparatus of the second embodiment changes methods for detecting a moving object on the basis of the relative positional relation between the moving object and the background model. More specifically, the three-dimensional object recognition apparatus of the second embodiment uses the background model (stationary object model), the road situation model, and recognition histories of moving objects to grasp information such as what scene situation each moving object set as a recognition target is currently under, whether there is any moving object previously detected, and what state each previously detected object is under the current scene situation. Subsequently, the three-dimensional object recognition apparatus recognizes the moving object after changing recognition methods to one suitable for the grasped situation. Therefore, even a moving object that is partially hiding, and a moving object that becomes recognized and unrecognized from one frame to another with a subtle luminance change can be continuously recognized, and the motion thereof can be followed. Furthermore, even when a moving object set as a recognition target travels on a curve of a road to have a change in shape or orientation, the moving object is stably detected and the motion thereof can be followed.

Figure 16A:
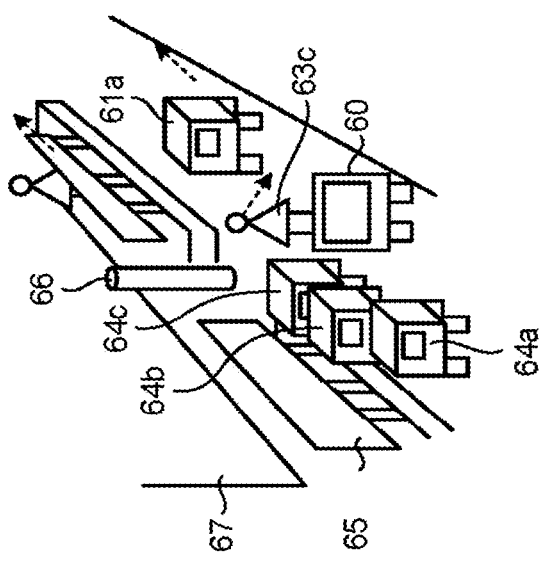
FIGS. 16A to 16C are diagrams for explaining another example of operation performed by the three-dimensional object recognition apparatus of the second embodiment to detect a moving object.
Figure 16B:
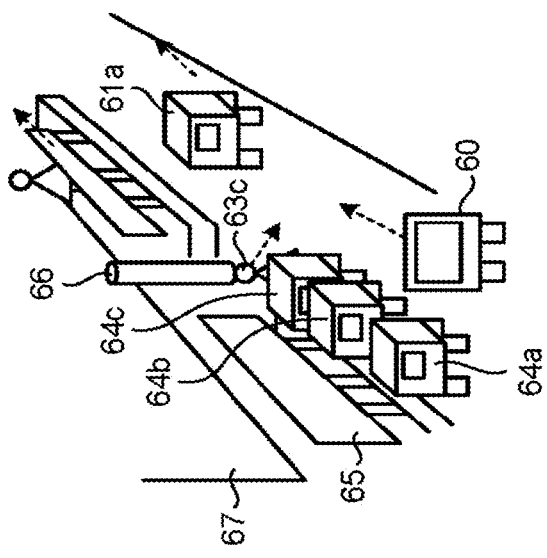
Figure 16C:
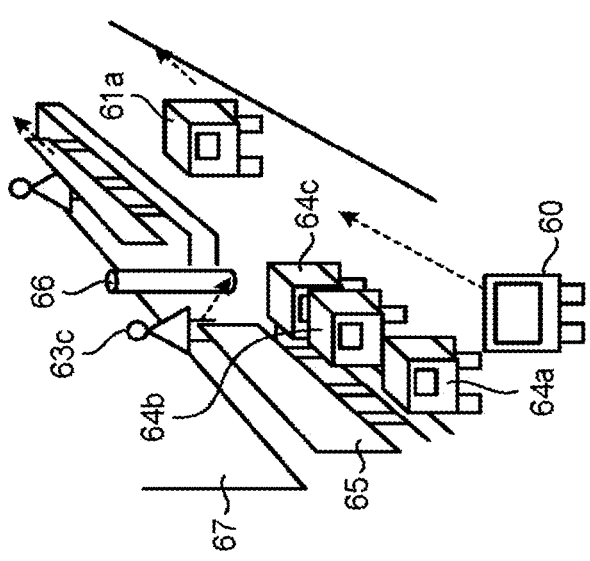

FIGS. 16A to 16C are diagrams illustrating the motion of the person 63c. As illustrated in FIGS. 16A and 16B, even when the person 63c moves and consequently hides beyond the front side of the parked vehicle 64c, the tracking detector 75 and the situation recognizer 76 perform processing designed for partial hiding of an object by using the background model, the road situation model, and the like. Thus, the motion of the person 63c can be continuously predicted and recognized. Therefore, as illustrated in FIG. 16C, even when the person 63c moves from a position in front of the parked vehicle 64c to a position in front of the user's vehicle 60 (even when the person 63c runs into the road), the user's vehicle 60 can be automatically stopped with automatic control on the brake.

Conventionally, recognition of the person 63c is terminated once the person 63c has hidden behind the parked vehicle 64c; and tracking thereof is newly started after the whole body of the person 63c can be newly recognized. Therefore, there have conventionally been such inconveniences as delay in processing or sudden braking. However, in the three-dimensional object recognition apparatus of the second embodiment, the ECU 95 illustrated in FIG. 21 accurately tracks and detects the motion of moving objects, and controls, in accordance with results of the detection, an automatic braking system, an automatic speed control system, a steering controller, or a headup display (HUD) 96. Thus, the user's vehicle 60 can be smoothly and safely controlled.

Third Embodiment

The following describes another three-dimensional object recognition apparatus as a third embodiment. The three-dimensional object recognition apparatus of the third embodiment determines a danger level based on the current situation of the user's vehicle, and performs control, such as speed control or steering wheel control, on the user's vehicle in accordance with the determination result. FIG. 17 illustrates a functional block diagram of functions that are implemented when the CPU 15 in the three-dimensional object recognition apparatus of the third embodiment operates in accordance with the three-dimensional object recognition program. As illustrated in FIG. 17, the three-dimensional object recognition apparatus of the third embodiment includes a three-dimensional information generator 86, a three-dimensional structure recognizer 87, an image recognizer 88, a scene recognizer 89, a situation predictor 90, a situation recognizer 91, a new-object detector 92, and a danger-level determining unit 93.

Figure 18A:
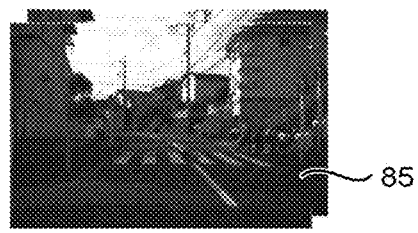
FIGS. 18A to 18F are views for explaining operation performed by the three-dimensional object recognition apparatus of the third embodiment for image processing and for recognition of a moving object.
Figure 18B:
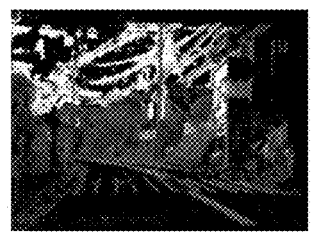
Figure 18C:

The three-dimensional information generator 86 generates a three-dimensional reconstructed image illustrated in FIG. 18B, which is an image corresponding to distance information calculated from, for example, parallax images 85 illustrated in FIG. 18A, which are captured by the stereo camera unit 1. The three-dimensional reconstructed image contains information on coordinates of X, Y, and Z (length, width, and height), and an overhead view of an area in front of the user's vehicle can also be obtained, as illustrated in FIG. 18C. The three-dimensional structure recognizer 87 recognizes three-dimensional structures present ahead of the user's vehicle, such as the wall 67 and a stationary-object boundary region explained with FIGS. 13A and 13B, which indicate a boundary between a region travelable with the user's vehicle and a region difficult to travel through by the user's vehicle, from the three-dimensional reconstructed image.

The image recognizer 88 compares the parallax images 85 generated from images captured by the stereo camera unit 1 with previously modeled images of road surface signs, traffic light signs, and traffic signs. The image recognizer 88 then extracts targets such as a road surface sign, a traffic light sign, and a traffic sign contained in the parallax images 85.

Figure 18D:
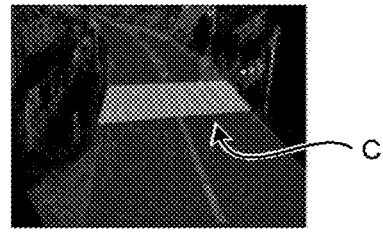

The scene recognizer 89 recognizes a road surface sign, a traffic light sign, a traffic sign, and the like from among the three-dimensional structures detected by the three-dimensional structure recognizer 87, in addition to the current situation (scene) found ahead of the user's vehicle regarding, for example, travelable regions and pedestrians. FIG. 18D indicates that the scene recognizer 89 has recognized a road present ahead of the user's vehicle as a travelable region, and also recognized a road surface sign indicating a crosswalk 86. Information on travelable regions and information on road surface signs, traffic light signs, traffic signs and the like that have been recognized by the scene recognizer 89 are fed to the situation recognizer 91.

The situation recognizer 91 is provided as one example of a moving object detector, and is configured to refer to the CAN information (such as a vehicle speed, an acceleration, a steer angle, and a yaw rate) of the user's vehicle acquired by the situation predictor 90, and then notify the danger-level determining unit 93 of a recognition result for the current situation regarding road surface signs, traffic light signs, traffic signs, pedestrians, and the like. The new-object detector 92 acquires a recognition result for the current situation present ahead of the user's vehicle from the situation recognizer 91, and notifies the danger-level determining unit 93 upon detecting a new moving object such as a bicycle or an oncoming vehicle. The danger-level determining unit 93 calculates danger levels from recognition results for the current situation present ahead of the user's vehicle.

A danger level is, for example, an indicator of the possibility of collision between a moving object and the user's vehicle. One exemplary idea is that high danger levels are calculated for vectors of moving objects opposing the user's vehicle in the traveling direction thereof. Furthermore, a low danger level is calculated for a moving object that moves in parallel to a straight line of a road shoulder or a sidewalk because such a moving object represents a pedestrian that moves along the sidewalk. To the contrary, a high danger level is calculated for a moving object that moves across a straight line of a road shoulder or a sidewalk because such a moving object represents a pedestrian that enters a road from the sidewalk. As parameters for calculating the danger levels, the "direction of the motion vector of a moving object found from situation recognition", the "size of the motion vector of a moving object found from situation recognition", the "moving speed of a moving object represented by the size of the motion vector of the moving object found from situation recognition", the "angle formed by the motion vector of a moving object found from situation recognition and the traveling direction of the user's vehicle", the "speed and acceleration of the user's vehicle", and the "distance from a moving object to the user's vehicle" can be used, for example. The danger levels are calculated by use of any one of these parameters or a combination of some or all of these parameters.

FIG. 19 is a diagram for explaining a first danger-level calculation method in the danger-level determining unit 93. In FIG. 19, the "X=0 plane" is a plane of a road on which the user's vehicle 60 is traveling. In the diagram, arrows from a moving object A and a moving object B indicate moving directions (directions of motion vectors) of the moving object A and the moving object B. Circles and squares on the respective arrows indicating the moving directions of the moving object A and the moving object B indicate the danger levels of the respective moving directions. More specifically, a square indicating a high danger level is assigned to a moving direction that is a direction approaching the user's vehicle 60. In contrast, a circle indicating a low danger level is assigned to a moving direction that is a direction moving away from the user's vehicle 60.

The danger-level determining unit 93 calculates a danger level of the moving object A based on a distance between the user's vehicle 60 and the moving object A when the absolute value of a motion vector V1 of the moving object A (or the moving object B) is smaller than a first threshold Th1 ($|V1|<Th1$); and the absolute value of the X component of the position of the moving object A is smaller than a second threshold Th2 ($|X|<Th2$).

When the motion vector V1 of the moving object A (or the moving object B) is approaching the X=0 plane on which the user's vehicle 60 is traveling, the danger-level determining unit 93 calculates a danger level using an arithmetic expression "danger level=(an expression formed with |V1|×an expression formed with θ)/(an expression formed with the distance between the user's vehicle and the moving object)", where θ denotes an angle formed by the motion vector V1 of the moving object A (or the moving object B) and a vector of the user's vehicle 60 in the moving direction thereof.

When the motion vector V1 of the moving object A (or the moving object B) moves away from the X=0 plane on which user's vehicle 60 is traveling, the danger-level determining unit 93 sets "the danger level=1". Note that a danger level of "1" indicates that the danger level is at the minimum value.

As a danger level thus calculated by the danger-level determining unit 93, a higher danger level is calculated for a case where "the distance between the moving object A (or the moving object B) and the user's vehicle 60 is smaller"; "the motion vector of the moving object A (or the moving object B) is directed toward the X=0 plane"; "the absolute value (|V|) of the motion vector of the moving object A (or the moving object B) is larger"; and "the angle (θ) formed by the motion vector of the moving object A (or the moving object B) and a vector of the user's vehicle 60 in the moving direction thereof is larger".

Figure 20:
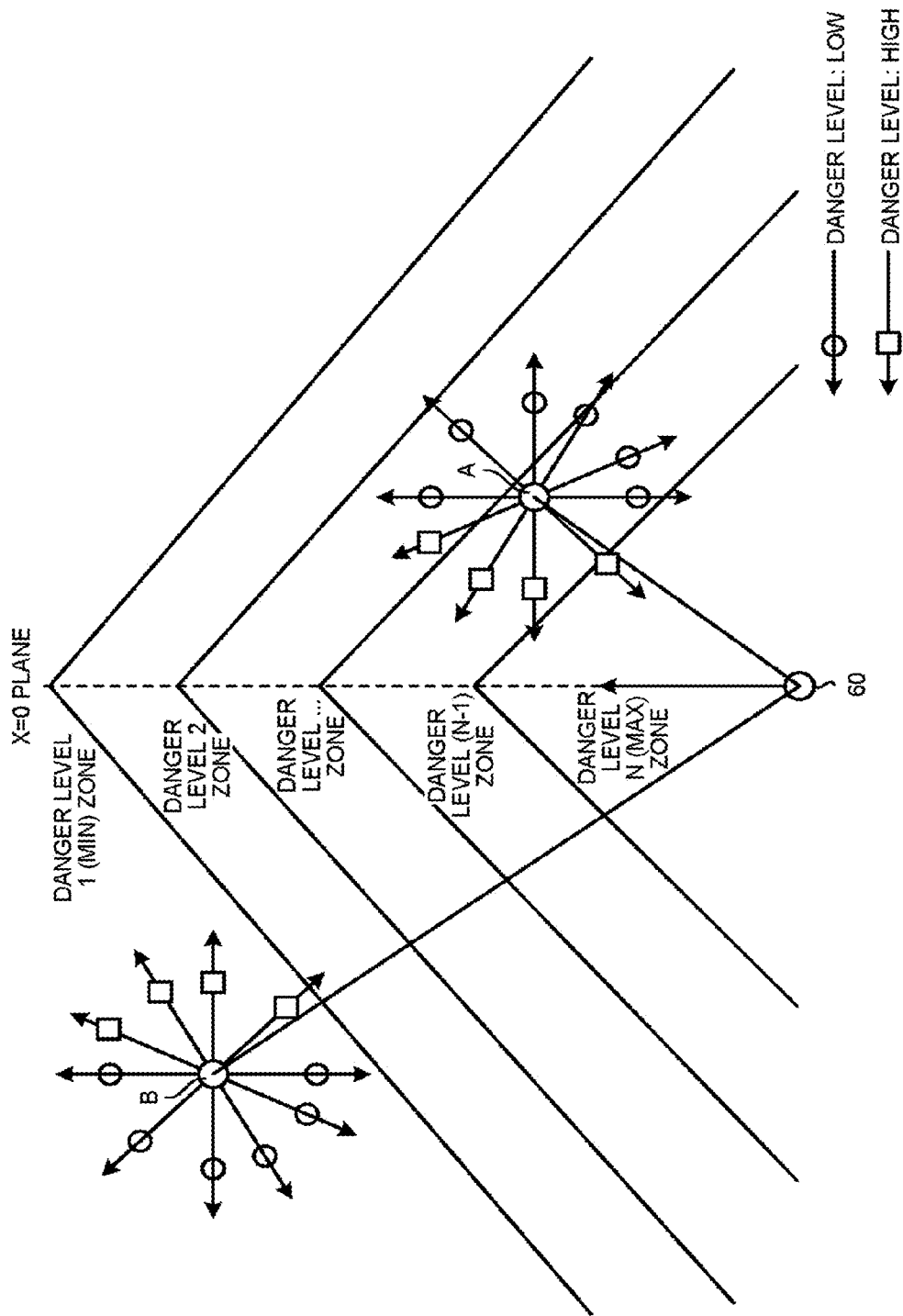
FIG. 20 is a diagram for explaining another example of operation performed by the three-dimensional object recognition apparatus of the third embodiment to calculate danger levels.

The following refers to FIG. 20, which is a diagram for explaining a second danger-level calculation method in the danger-level determining unit 93. This second danger-level calculation method illustrated in FIG. 20 determines a danger level based on the position of the moving object A (or the moving object B) in a previously prepared space region sectioned by danger levels. In an example illustrated in FIG. 20, a space region is sectioned into zones by danger levels such that zones with a danger level (the minimum danger level), a danger level 2, . . . a danger level N−1, and a danger level N (the maximum danger level) are placed in order from farther to nearer to the user's vehicle 60.

Additionally, weights are assigned to the danger level 1 to the danger level N in accordance with the direction and the size of the motion vector of the moving object A (or the moving object B) relative to the moving direction of the user's vehicle 60. A state in FIG. 20, in which the respective zones of the danger level 1 to the danger level N are divided from each other by straight lines (not necessarily straight lines) that form a predetermined angle with the traveling direction of the user's vehicle 60, indicates that weights are assigned to the danger level 1 to the danger level N.

When the danger level calculation method illustrated in FIG. 20 is used, the danger-level determining unit 93 calculates a danger level based on the distance between the user's vehicle 60 and the moving object A (or the moving object B) and the direction and the size of the motion vector of the moving object A (or the moving object B) relative to the moving direction of the user's vehicle 60.

Figure 18E:
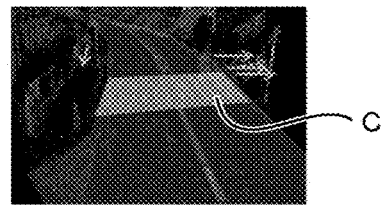
Figure 18F:
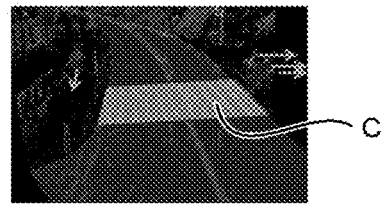

For example, in an example illustrated in FIGS. 18E and 18F, directions indicated by arrows represent the moving directions of pedestrians transverse a passable region for pedestrians. FIG. 18F is later in time than FIG. 18E. In this example in FIGS. 18E and 18F, there are no pedestrians on the crosswalk 86. A plurality of pedestrians indicated by a plurality of arrows in the right-hand side of each of these views are walking in a direction that moves away from the crosswalk 86. A pedestrian indicated by one arrow in the left-hand side of each of these views is walking in parallel to the user's vehicle, with a sufficient distance secured between the pedestrian and the user's vehicle. In this case, the danger-level determining unit 93 outputs danger-level determination information that indicates a low danger level.

In contrast, for example, when a pedestrian is walking on the crosswalk 86, when a pedestrian is approaching the crosswalk 86, when there is not a sufficient distance secured between the user's vehicle and a pedestrian, when the user's vehicle is traveling in a school zone, the danger-level determining unit 93 outputs danger-level determination information that indicates a high danger level.

The danger-level determination information from the danger-level determining unit 93 is fed to external equipment such as automatic braking system or an automatic speed control system, via the serial IF 19 illustrated in FIG. 2. The automatic braking system uses the above-described recognition data for recognition targets and the danger-level determination information to control braking of the user's vehicle. The automatic speed control system uses the recognition data for a recognition target to control the speed of the user's vehicle. The automatic braking system or the automatic speed control system adjusts the traveling speed by braking the user's vehicle in a stepwise manner according to the danger level. For example, when danger-level determination information that indicates a high danger level is fed, the automatic braking system or the automatic speed control system automatically brakes the user's vehicle to slow down the traveling speed thereof to a safe traveling speed.

Herein, the danger-level determining unit 93 changes determination criteria for danger levels in accordance with an image of a road surface sign, a traffic light sign, a traffic sign, or the like, which is recognized by the image recognizer 88 from the parallax images 85. Although this is merely one example, when letters or a sign of "SCHOOL ZONE" appearing on a road is recognized by the image recognizer 88, the danger-level determining unit 93 changes thresholds for use in assigning danger levels to lower values, and then assigns danger levels.

Thus, the criterion for assigning danger levels can be lowered, so that a high danger level is more likely assigned to a moving object that moves on a road bearing letters or a sign of "SCHOOL ZONE" or in the neighborhood thereof. Additionally, in a school zone where such a situation as having a child running into a road more likely occurs frequently, the assignment of a high danger level results in actuation of the automatic braking system or the automatic speed control system, so that the traveling speed of the user's vehicle can be slowed down to a safe traveling speed. Furthermore, high-level awareness can be delivered to the driver, whereby danger level prediction that can sufficiently guarantee safety is enabled.

Furthermore, when, other than a school zone, letters such as "STOP", "DANGER" or "CROSSING AHEAD", or a sign of a stop line or a crosswalk appearing on a road at a T-junction or a crossing is recognized by the image recognizer 88, the danger-level determining unit 93 changes thresholds for use in assigning danger levels to lower values, and then assigns danger levels. Thus, a high danger level is more likely assigned to a moving object that moves on a road at a T-junction or a crossing or in the neighborhood thereof. Therefore, the assignment of a high danger level results in actuation of the automatic braking system or the automatic speed control system, which is one example of a unit subject to control, so that the traveling speed of the user's vehicle can be slowed down to a safe traveling speed. Furthermore, awareness of, for example, the danger of a person, a vehicle, a bicycle, a motorcycle, or the like moving into an area in front of the user's vehicle from outside the field of vision of the driver can be delivered to the driver. Furthermore, in a crossing or the like where such a change in situation more likely occurs frequently, danger level prediction that can sufficiently guarantee safety is enabled.

Although the above-described example is one in which the criterion for danger-level determination is lowered, the danger-level determining unit 93 assigns danger levels after raising the thresholds for danger-level determination, when no pedestrian, no obstacle, and no sign is recognized by the image recognizer 88 on a road with good visibility. Thus, the criterion for danger level determination is raised, whereby a low danger level is more likely assigned to a moving object around the user's vehicle, thereby enabling the driver to drive in an unrestricted manner. Furthermore, danger levels may be used for a purpose other than control of a traveling speed. For example, the danger-level determination information is fed to the steering controller, which is one example of a unit subject to control, so that steering wheel control to secure safety against a moving object with a high danger level is performed.

As can be clearly understood from the above description, the three-dimensional object recognition apparatus of the third embodiment determines a danger level based on the current situation of the user's vehicle, and performs control, such as speed control or steering wheel control, on the user's vehicle in accordance with the determination result. Additionally, the three-dimensional object recognition apparatus controls the user's vehicle while changing determination criteria for danger levels from an image regarding a danger level of a target or the like, the image having been recognized from the parallax image 85. Thus, danger level prediction that can sufficiently guarantee safety is enabled, and the same effects as those of the above-described embodiments can be obtained.

Fourth Embodiment

Figure 21:
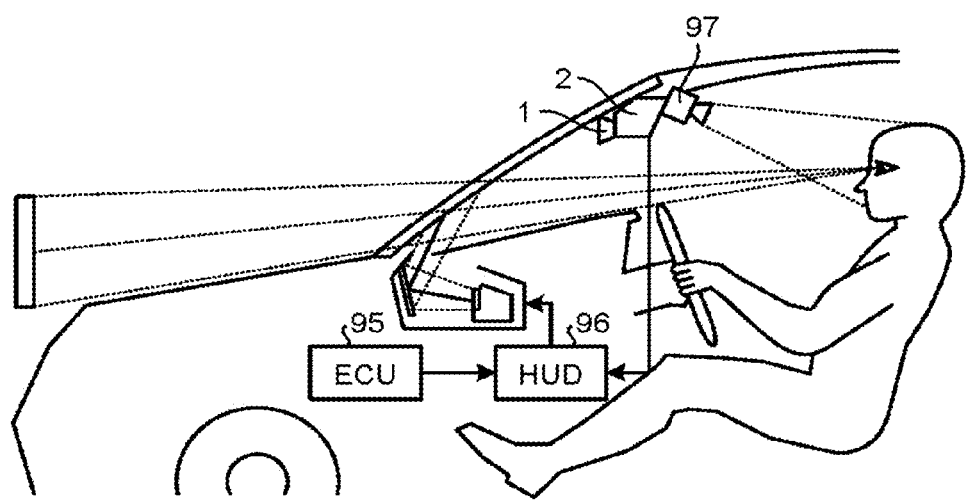
FIG. 21 is a hardware configuration diagram of a three-dimensional object recognition apparatus of a fourth embodiment.

The following describes another three-dimensional object recognition apparatus as a fourth embodiment. The three-dimensional object recognition apparatus of the fourth embodiment displays drive information in the field of vision of the driver via a headup display (HUD), the drive information determined based on a road situation and danger levels (danger-level determination information). FIG. 21 illustrates a hardware configuration of a three-dimensional object recognition apparatus according to the fourth embodiment. As illustrated in FIG. 21, the three-dimensional object recognition apparatus of the fourth embodiment includes the ECU 95 for a vehicle and a headup display (HUD) 96. Additionally, the three-dimensional object recognition apparatus includes the information processor 2 provided with the stereo camera unit 1, and a driver-monitoring camera unit 97 that captures images of the driver. The ECU 95 is one example of a controller. The HUD 96 is one example of a unit subject to control.

The information processor 2 recognizes, based on parallax images captured by the stereo camera unit 1, a situation (positional relations between moving objects and stationary objects such as the background and the road) present ahead of the vehicle as described above, and feeds the recognition result and the danger-level determination information to the ECU 95. The ECU 95 controls the HUD 96 to display such information as the road situation calculated by the information processor 2 and danger levels represented as the danger-level determination information by superimposing the information on the field of vision of the driver. The driver-monitoring camera unit 97 is disposed in such a manner as to include the right and left eyes of the driver within its angle of view, thereby detecting the directions of the eyes of the driver. Although the driver-monitoring camera unit 97 is disposed over the head of the driver in FIG. 21, where to dispose the driver-monitoring camera unit 97 does not matter as long as the directions of the eyes thereof can be detected.

The HUD 96 is, for example, an optical system embedded inside the dashboard, and is a module to convert an internally-generated intermediate image into an virtual image enlarged through such instruments as a mirror and a lens and display images that provides a certain sense of distance to the eyes of the driver. As the implementation form of the HUD 96, the panel projection type and the laser-scanning type are possible, and either of these types may be used. A laser-scanning-type HUD can provide virtual images with a wider field of view, and can display high-luminance images that are robust to external light. Therefore, although this is merely one example, the three-dimensional object recognition apparatus of the embodiment is provided with a laser-scanning-type HUD as the HUD 96.

Figure 22:
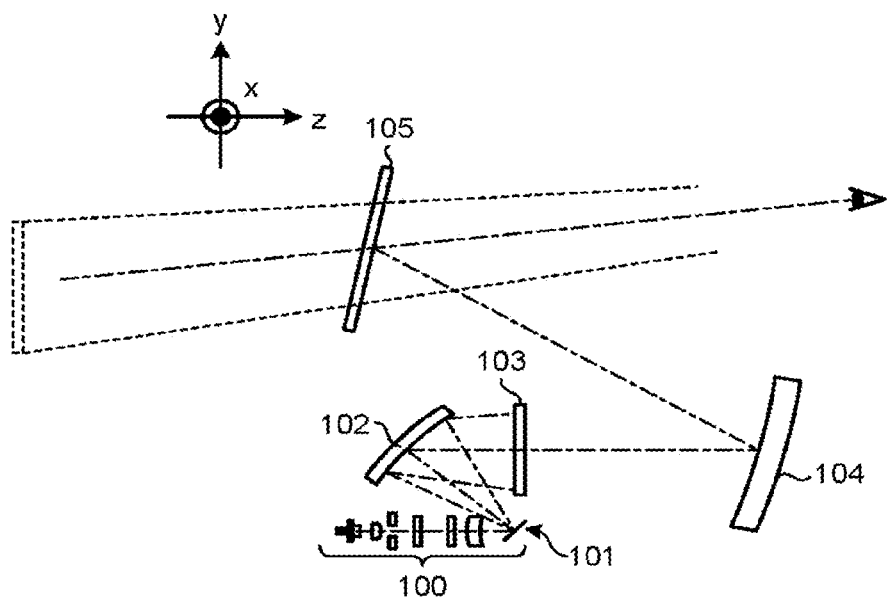
FIG. 22 is a configuration diagram illustrating the structure of a headup display included in the three-dimensional object recognition apparatus of the fourth embodiment.

FIG. 22 is a diagram illustrating the hardware configuration of the HUD 96 of the laser-scanning type. As illustrated in FIG. 22, in the HUD 96, a light source scanning unit 100 combines laser beams of three colors, i.e., R (red), G (green), and B (blue). The combined laser beams of the three colors are guided toward a reflective surface of an optical deflector 101. The optical deflector 101 may be a mirror system including a single minute mirror that swings about two axes perpendicular to each other, or two mirrors each of which swings or rotates about one axis. The optical deflector 101 is implemented in the form of micro electro mechanical systems (MEMS) produced through a semiconductor process or the like. Light flux deflected by the optical deflector 101 is reflected by a concave mirror 102, and depicts two-dimensional images on a surface 103 to be scanned.

The surface 103 to be scanned diverges laser beams at desired divergence angles. As the surface 103 to be scanned, a microlens array structure is suitable. Light flux emitted from the surface 103 to be scanned is enlarged by a concave mirror 104 and a semi-transmissive mirror 105 to be displayed. A transmissive optical element such as a lens or a prism may be included.

Figure 23:
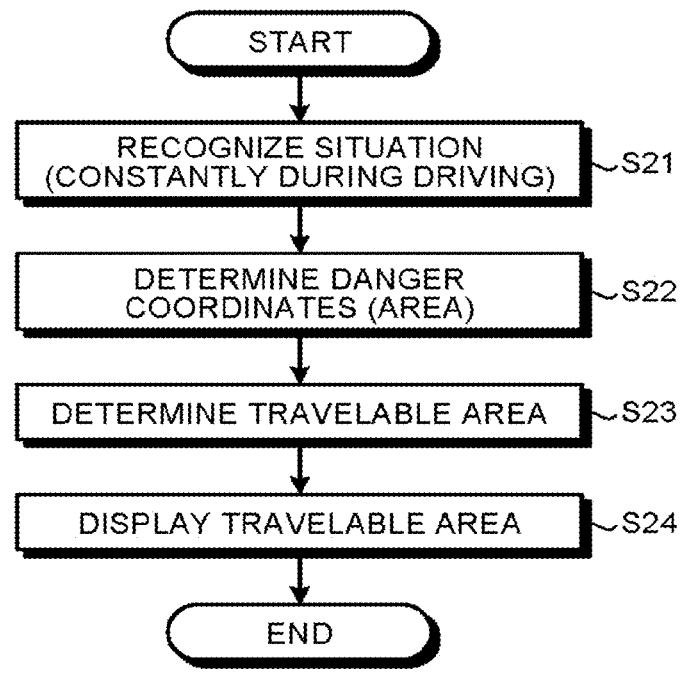
FIG. 23 is a flowchart illustrating a procedure of operation to display road information through the headup display included in the three-dimensional object recognition apparatus of the fourth embodiment.

The following refers to a flowchart in FIG. 23, which illustrates a procedure of operation performed by the HUD 96 to display the drive information. At step S21, the information processor 2 recognizes information such as how a vehicle traveling ahead is moving, and a road situation, as described in the first embodiment and the second embodiment. Thereafter, at step S22, the information processor 2 determines danger coordinates (region) based on the danger levels of moving objects, as described in the third embodiment. Furthermore, at step S23, the information processor 2 determines a travelable region for the user's vehicle from the current situation recognized at step S21 and the danger region determined at step S22. Finally, at step S24, the HUD 96 displays, within the field of vision of the driver, the drive information determined by the information processor 2 from the road situation and the danger levels.

Specifically, when the danger-level determination information that contains danger-level information indicating a low danger level is fed, the ECU 95 displays via the HUD 96, for example, such a message as "The current danger level is low; however, drive with full attention to the surrounding situation." In contrast, for example, when a pedestrian is approaching the crosswalk 86, the ECU 95 displays via the HUD 96, for example, such a message as "A pedestrian is approaching the crosswalk. Watch out for crossing pedestrians." Thus, the driver can be notified of and alerted to danger, so that safe driving can be promoted.

Herein, the danger-level determining unit 93 changes determination criteria for danger levels in accordance with an image of a road surface sign, a traffic light sign, a traffic sign, or the like, which is recognized by the image recognizer 88 from the parallax images 85. Although this is merely one example, when a set of letters or a sign of "SCHOOL ZONE" appearing on a road is recognized by the image recognizer 88, the danger-level determining unit 93 changes thresholds for danger-level assignment to lower values, and then assigns danger levels.

Thus, the criterion for assigning danger levels can be lowered, so that a high danger level can be more likely assigned to a moving object that moves on a road bearing letters or a sign of "SCHOOL ZONE" or in the neighborhood thereof. Furthermore, in a school zone where such a situation as a child running into a road likely occurring frequently, a high danger level is assigned, so that high-level awareness can be delivered to the driver, and danger level prediction that can sufficiently guarantee safety is enabled.

Furthermore, when, other than a school zone, letters such as "STOP", "DANGER" or "CROSSING AHEAD", or a sign of a stop line or a crosswalk appearing on a road at a T-junction or a crossing is recognized by the image recognizer 88, the danger-level determining unit 93 changes thresholds for the assignment of danger levels to lower values, and then assigns danger levels. Thus, a high danger level can be more likely assigned to a moving object that moves on a road at a T-junction or a crossing or in the neighborhood thereof. Furthermore, awareness of such danger as having a person, a vehicle, a bicycle, a motorcycle, or the like moving into an area in front of the user's vehicle from outside the field of vision of the driver can be delivered to the driver. Furthermore, in a crossing or the like where such a change in situation more likely occurs frequently, danger level prediction that can sufficiently guarantee safety is enabled.

Although the above-described example is one in which the criterion for danger-level determination is lowered, the danger-level determining unit 93 raises the thresholds for the danger-level assignment and then assigns danger levels when no pedestrian, no obstacle, and no sign are recognized by the image recognizer 88 on a road with good visibility, for example. Thus, the criterion for danger level determination can be raised, so that a low danger level can be more likely assigned to a moving object around the user's vehicle, and the driver is allowed to drive in a substantially unrestricted manner.

This example is described with the assumption that display via the HUD 96 is performed. However, notification corresponding to the danger-level determination information may be delivered through audio output via a speaker, light-emission control on a light-emitting diode (light emitter), or vibration control on a vibrator. More specifically, notification corresponding to the danger-level determination information may be delivered via a notifier such as a display, a speaker, a light emitter, or a vibrator.

Figure 24:
FIG. 24 is a view for explaining a first example of displaying the road information through the headup display in the three-dimensional object recognition apparatus of the fourth embodiment.

The following describes specific examples of display performed by the information processor 2 via the HUD 96. Firstly, FIG. 24 is one example of display to be performed when an oncoming vehicle 111 is recognized while the user's vehicle is attempting to overtake a vehicle 110 stopping ahead of the user's vehicle. In this case, the information processor 2 predicts whether the oncoming vehicle 111 is to stop or to continue traveling, on the basis of how the oncoming vehicle 111 is slowing down. Upon detecting that the oncoming vehicle 111 is to stop, the information processor 2 displays a predicted stop line via the HUD 96. The information processor 2 then calculates the relative speed of the oncoming vehicle 111, predicts a stopping position thereof, and displays a solid filled part 112 via the HUD 96 on a road surface.

In this case, the information processor 2 may display the solid filled part 112 with a gradation such that the density thereof changes from farther to nearer to the user's vehicle, in order that directionality and a sense of width can be added to a view. Alternatively, the information processor 2 may display the solid filled part 112 as an animated image such that the solid filled part 112 is marked in a swept manner from the oncoming vehicle 111 toward the user's vehicle.

Alternatively, the information processor 2 may display a linear predicted stop line instead of the solid filled part 112. In this case, the predicted stop line can be visualized. Additionally, thus displaying the predicted stop line can serve to prevent an inconvenience with the solid filled part 112, as a virtual image, occupying an excessively large area in the field of vision of the driver, and can be less bothersome.

The information processor 2 may also display an arrow that encourages overtaking of the stopping vehicle 110 when predicting that the oncoming vehicle 111 is to stop. There is apprehension that, with the solid filled part 112 or the predicted stop line displayed, the driver can be at a loss to decide what action to take next. However, with the arrow encouraging the overtaking displayed, the driver can be notified that safe overtaking is possible, and can therefore be encouraged to act proactively. Furthermore, with the arrow encouraging the overtaking displayed, a clear distinction can be made between such encouragement and the solid filled part 112 or the predicted stop line, and confusion of the driver can be avoided as a consequence.

Subsequently, for example, when a pedestrian or a bicycle traveling at a constant speed at a position sufficiently far from the user's vehicle is recognized, the information processor 2 performs gradation display via the HUD 96 such that luminance levels increase along the traveling direction of a pedestrian or the bicycle. If gradation display is performed such that luminance levels increase along a direction opposite to the traveling direction of the pedestrian or the bicycle, the driver may be unnecessarily alerted by mistakenly assuming that the "pedestrian or bicycle is moving toward this vehicle". Therefore, the driver can be informed of the presence and the traveling direction of the pedestrian or the bicycle through gradation display such that luminance levels increase along the traveling direction of the pedestrian or the bicycle.

Figure 25:
FIG. 25 is a view for explaining a second example of displaying the road information through the headup display in the three-dimensional object recognition apparatus of the fourth embodiment.

Next, FIG. 25 is another example of display to be performed when, while the user's vehicle is approaching a bicycle traveling ahead thereof, the bicycle suddenly starts wobbling and moving toward a roadway. In this case, the information processor 2 detects sudden sideward changes in relative speeds of the bicycle and the user's vehicle with respect to the traveling direction of the user's vehicle. Additionally, the information processor 2 calculates a high danger level because the user's vehicle and the bicycle are at a short distance apart. In this case, as illustrated in FIG. 25, the information processor 2 displays, via the HUD 96, a group of motion vectors for predicted motions of the bicycle as alerting information indicating a region to be avoided. Although this is merely one example, this group of motion vectors is represented as an image of wave rings (a normal-line group 115) that are increasingly larger from the bicycle toward the road on which the user's vehicle is traveling. This normal-line group 115 may be displayed as an immobile image, or may be displayed as an animated image such that the image enlarges from the bicycle toward the road.

If the motion vectors of the bicycle are represented as arrows that have directionality, these arrows are displayed as a bundle of motion vectors extending radially from the target at the center, and such display may make it difficult to intuitively grasp a region to be avoided. In contrast, displaying the motion vectors of the bicycle as the normal-line group 115 enables the driver to be accurately notified of the region to be avoided, thereby being allowed to grasp a well-calculated distance between the user's vehicle and the bicycle.

Note that the information processor 2 displays the normal-line group 115 with higher luminance than luminance with which it displays the track of the motion of the bicycle. Displaying the normal-line group 115 and the track of the motion of the bicycle with a difference in luminance makes it possible to avoid the inconvenience of giving the driver an impression that the normal-line group 115 tags around with the bicycle. Additionally, the displaying also makes it possible to notify the driver that there is a dangerous state.

Additionally, the information processor 2 displays the normal-line group 115 in blue when its danger level is low, displays the normal-line group 115 in yellow when its danger level is moderate, and displays the normal-line group 115 in red when its danger level is high. More specifically, the information processor 2 displays the normal-line group 115 in a color according to its danger level. This displaying makes it possible to notify the driver of the danger level with a color in which the normal-line group 115 is displayed.

Subsequently, when there is a vehicle traveling ahead that has been traveling in an adjacent lane, the information processor 2 recognizes and starts tracking this vehicle traveling ahead, as described above. Thus, even in a state where the stereo camera unit 1 can image only a part of the vehicle traveling ahead because the user's vehicle and the vehicle traveling ahead has started to travel in parallel, the information processor 2 can track the motion of the vehicle traveling ahead. Even in such a state, when the vehicle traveling ahead (hereinafter referred to as an overtaking vehicle) that has been positioned once in the rear of the user's vehicle attempts to overtake the user's vehicle, the information processor 2 detects a motion vector by which it is predicted that the overtaking vehicle is to overtake the user's vehicle, from the relative speeds of the user's vehicle and the overtaking vehicle. Subsequently, the information processor 2 displays, via the HUD 96, a predicted moving route (virtual track) of the overtaking vehicle, which is to overtake the user's vehicle from behind.

Figure 26:
FIG. 26 is a view for explaining a third example of displaying the road information through the headup display in the three-dimensional object recognition apparatus of the fourth embodiment.
Figure 27A:
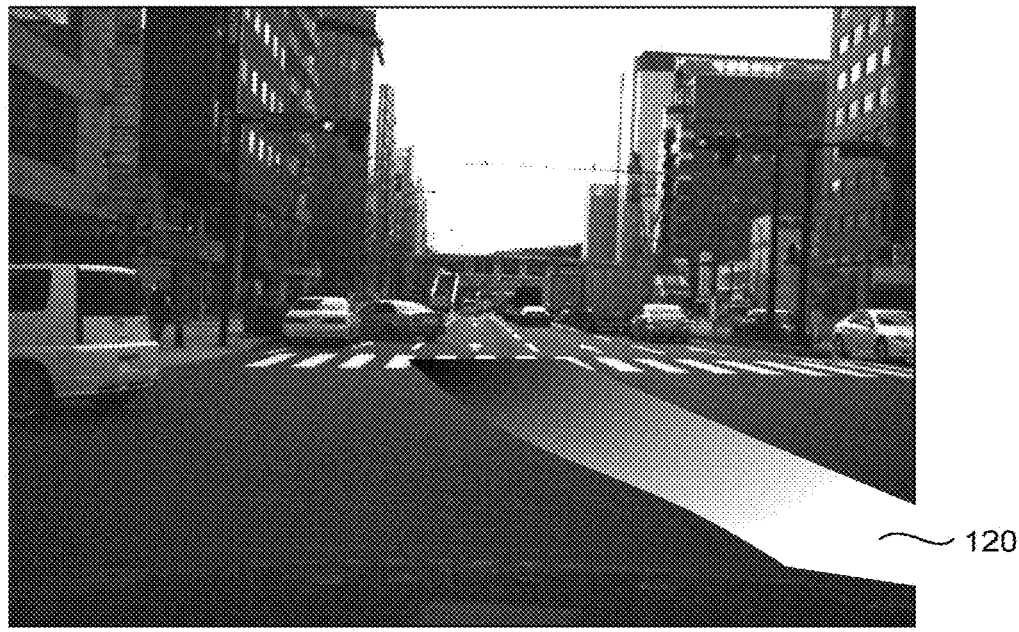
FIGS. 27A and 27B are views for explaining another third example of displaying the road information through the headup display in the three-dimensional object recognition apparatus of the fourth embodiment.
Figure 27B:
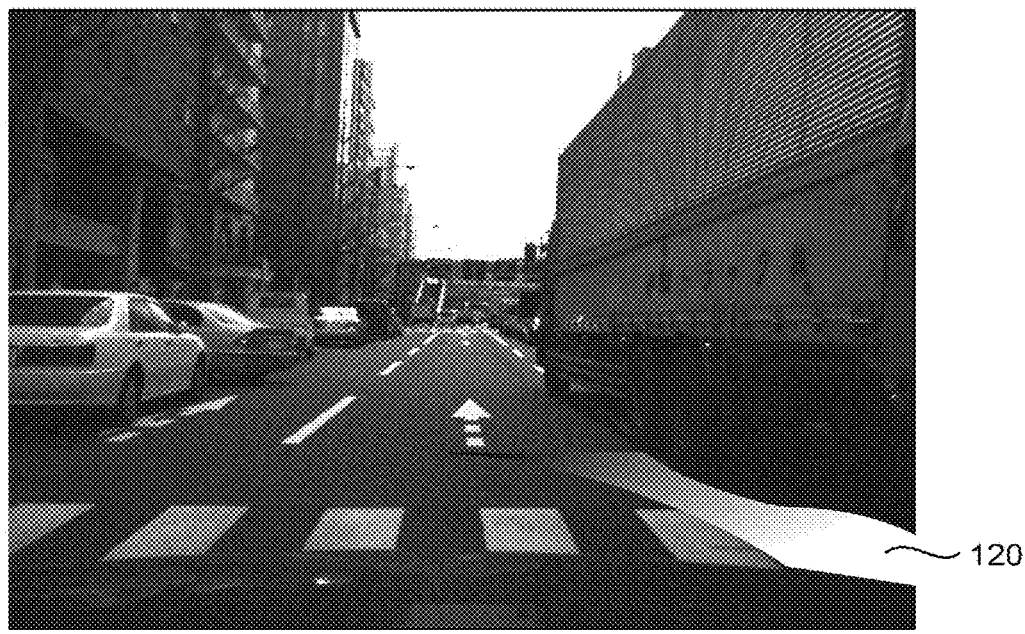

A view in FIG. 26 and FIGS. 27A and 27B illustrates one example of display of a virtual track of an overtaking vehicle whose overtaking the user's vehicle is predicted. Upon detecting a motion vector by which it is predicted that the user's vehicle is overtaken, the information processor 2 displays a belt-like virtual track 120 on an adjacent lane, which is adjacent to a lane on which the user's vehicle is traveling, the belt-like virtual track 120 indicating a possibility of existence of an overtaking vehicle there, as illustrated in FIG. 26. Although this is merely one example, the information processor 2 displays the virtual track 120 with high luminance and in a red belt-like shape, for example. Note that the virtual track 120 may be displayed with regular luminance, and may be displayed in a color other than red. Displaying the virtual track 120 described above makes it possible to notify the driver for the user's vehicle that there is an overtaking vehicle. Additionally, while displaying the virtual track 120, the information processor 2 feeds the ECU 95 with information that prohibits acceleration of the user's vehicle. Thus, safety of the user's vehicle can be secured.

Subsequently, when the overtaking vehicle has further approached the user's vehicle, the information processor 2 displays the belt-like virtual track 120 coming from the adjacent traveling lane into the traveling lane on which the user's vehicle is present, as illustrated in FIG. 27A. Thus, the driver of the user's vehicle can be notified of the possibility that the overtaking vehicle is to change lanes from the adjacent traveling lane to a position in front of the user's vehicle. Additionally, the driver can intuitively restrain acceleration of the user's vehicle because the driver can recognize the possibility that the overtaking vehicle is to change lanes from the adjacent traveling lane to a position in front of the user's vehicle. In addition to the above-described virtual track 120, for example, letters or an icon, such as "Caution: Vehicle behind is approaching", telling the approach of an overtaking vehicle and indicating an alert thereto may be displayed.

Subsequently, when the overtaking vehicle starts changing lanes after overtaking the user's vehicle, the information processor 2 displays the belt-like virtual track 120 along a predicted moving route of the overtaking vehicle, as illustrated in FIG. 27B. Thus, the driver of the user's vehicle can drive safely in such a manner as to slow down the user's vehicle so as not to hinder the overtaking vehicle from changing lanes.

Note that, after displaying the virtual track 120, the information processor 2 stops displaying the thus far displayed virtual track 120 when the traveling speed of the user's vehicle has become lower than a predetermined traveling speed with the driver having detected slowing down of the traveling speed of the user's vehicle.

Figure 28:
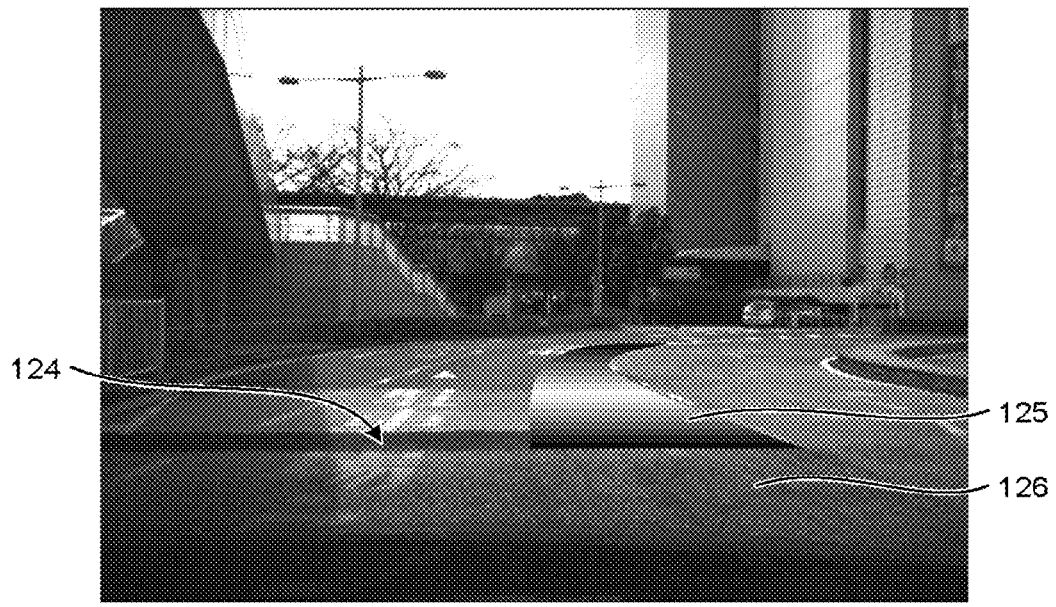
FIG. 28 is a view for explaining a fourth example of displaying the road information through the headup display in the three-dimensional object recognition apparatus of the fourth embodiment.

The following describes an example where there is a road having a traveling line difficult to recognize. For example, an example illustrated in FIG. 28 is a road having a plurality of lanes and curving ahead. A road 124 on the left side is built as a road for entering a parking lot, and a road at the center adjacent to the road 124 is built as a road 126 that continuously extends forward. On the thus built road, the information processor 2 recognizes letters written on the road to recognize the road 124 on the left side as a road for entering a parking lot, as described in the third embodiment. Subsequently, in this case, the information processor 2 displays a belt-like guiding line 125 along the road 126 continuously extending forward, via the HUD 96. Thus, even on a road having lines built in a complex manner, the driver can be clearly informed of a line that continuously extends forward.

Figure 29:
FIG. 29 is a view for explaining a fifth example of displaying the road information through the headup display in the three-dimensional object recognition apparatus of the fourth embodiment.

The following describes a case where there is, for example, a store transmitting advertising information or the like to a vehicle traveling near the store via wireless communication. Upon receiving such wirelessly communicated information, the ECU 95 displays it via the HUD 96. An example in FIG. 29 is an example to be displayed when traveling near XX Store, the vehicle has received advertising information that a sale is now in progress at XX Store. In this case, the information processor 2 displays received information such as "SALE NOW IN PROGRESS AT XX STORE" via the HUD 96. Thus, the driver can be informed that XX Store has a sale now in progress, and can take appropriate actions such as visiting XX Store and purchasing a desired product.

As described above, the three-dimensional object recognition apparatus of the fourth embodiment can appropriately recognize the road environment, the current situation of the user's vehicle and the like, and display intuitively recognizable drive information in the field of vision of the driver via the HUD 96. Thus, safe driving of the driver can be supported.

Fifth Embodiment

The following describes another three-dimensional object recognition apparatus as a fifth embodiment. This three-dimensional object recognition apparatus of the fifth embodiment causes a navigation device to search again for another route in accordance with a road situation and displays drive information according to the road situation on the HUD 96.

Figure 30:
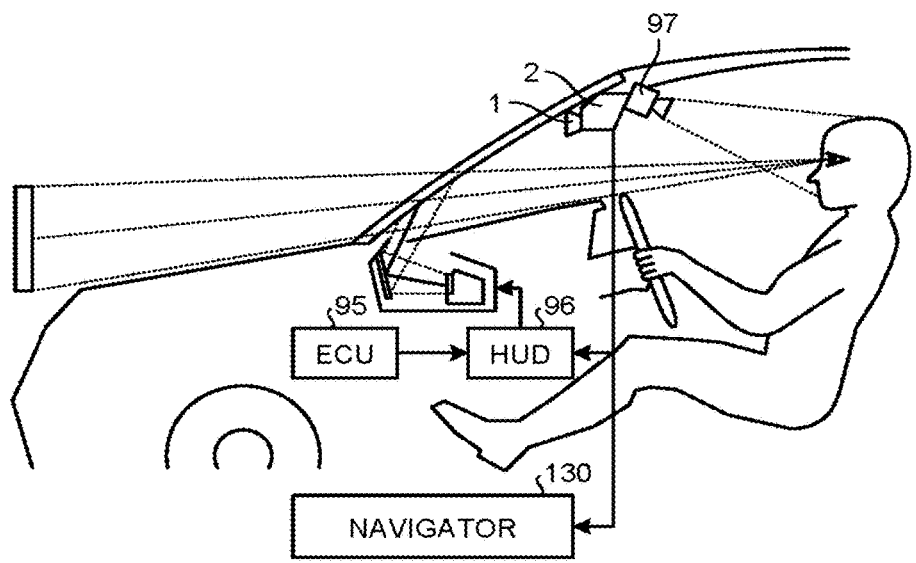
FIG. 30 is a hardware configuration diagram of a three-dimensional object recognition apparatus of a fifth embodiment.

FIG. 30 illustrates the hardware configuration of the three-dimensional object recognition apparatus of the fifth embodiment. As illustrated in FIG. 30, the three-dimensional object recognition apparatus of the fifth embodiment includes the ECU 95 for the vehicle, and the HUD 96, which are described in the fourth embodiment. Additionally, the three-dimensional object recognition apparatus of the fifth embodiment includes the information processor 2 provided with the stereo camera unit 1, the driver-monitoring camera unit 97 that captures images of the driver, and a navigator 130 that displays a route to a destination. The navigator 130 is configured to display, via the HUD 96, a route to a destination input from the driver.

Figure 31:
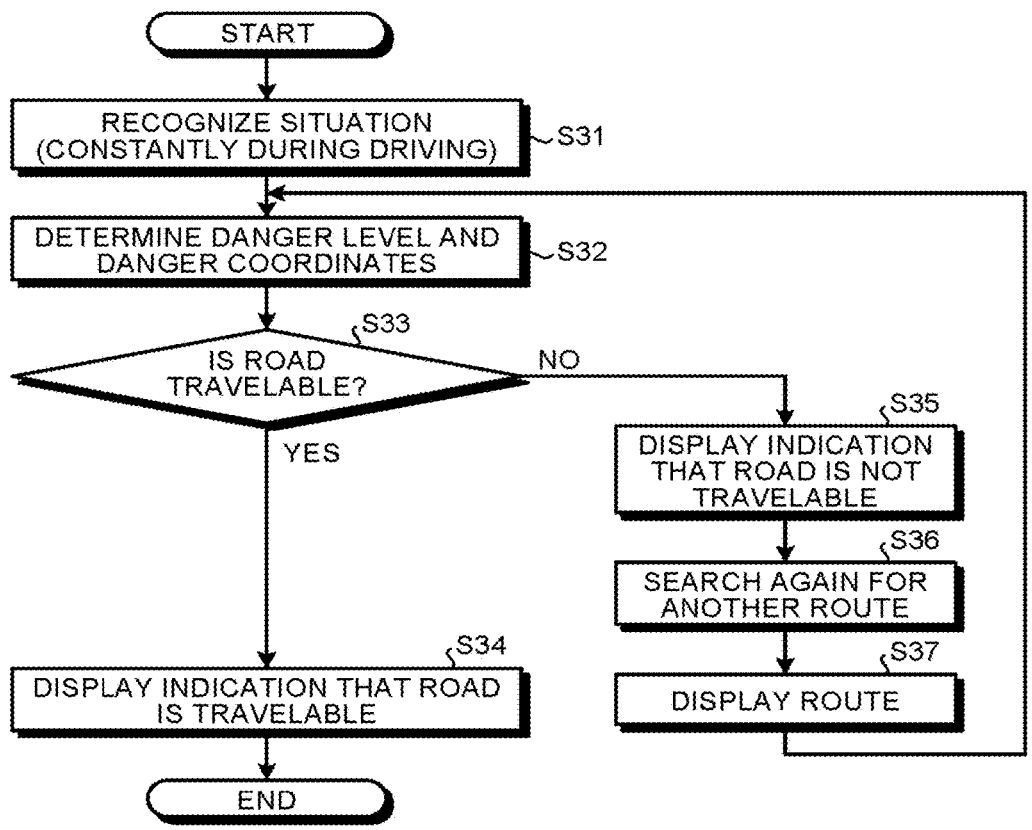
FIG. 31 is a flowchart for explaining a procedure of rerouting operation performed by a navigator in the three-dimensional object recognition apparatus of the fifth embodiment.

A flowchart in FIG. 31 illustrates a procedure of operation of the three-dimensional object recognition apparatus of the fifth embodiment. After the driver inputs a destination to the navigator 130, and the navigator 130 then searches for a route to the destination, processing of the flowchart of FIG. 31 is started when a route found by the searching is displayed on the HUD 96.

When the processing of the flowchart of FIG. 31 is started, the information processor 2 recognizes a situation at step S31, and determines, at step S32, danger levels for such objects as a road on which the user's vehicle is traveling, as described in the third embodiment. The information processor 2 then determines, using the road situation and the danger levels detected at step S31 and step S32, whether a road on which the user's vehicle is to travel is travelable with safety, at step S33. Note that the "road on which the user's vehicle is to travel" herein means a road within a range in which the determination is possible based on a parallax image generated by images captured by the stereo camera unit 1. If the information processor 2 determines at step S33 that the road on which the user's vehicle is to travel is travelable with safety (Yes at step S33), the processing proceeds to step S34, where the information processor 2 displays via the HUD 96, on a screen having the route displayed thereon by the navigator 130, indication that the road is travelable with safe.

On the other hand, if the information processor 2 determines at step S33 that the road on which the user's vehicle is to travel has difficulty in traveling on with safety (No at step S33), the processing proceeds to step S35. At step S35, the information processor 2 displays via the HUD 96, on the screen having the route displayed thereon by the navigator 130, indication that the road is difficult to travel on. Additionally, at step S35, the information processor 2 issues to the navigator 130 a request to search again for another route. Upon receiving the request to restart search again for another route, the navigator 130 searches for another route at step S36, and displays a route found in the searching via the HUD 96 at step S37.

As described above, the three-dimensional object recognition apparatus of the fifth embodiment searches for another route different from a route found in searching by the navigator 130 depending on the road situation, and displays the newly found route via the HUD 96. Thus, when a route found in searching by the navigator 130 is not suitable to travel on, immediate rerouting is performed, so that a route suitable to travel on can be presented to the driver. Therefore, safe driving of the driver can be promoted.

Although the above-described embodiment uses danger levels to determine whether to search for another route, the embodiment is not limited to this example, and other information may be used. For example, information from the background model (stationary-object boundary regions) explained with FIGS. 13A and 13B and information on the width of the user's vehicle may be used. When a distance between stationary objects present ahead in the traveling direction of the user's vehicle is smaller than the width of the user's vehicle, a search for another route is conducted. In this situation, it is preferable that the search for another route be conducted if a given width is smaller than a distance between stationary objects, the given width having been set to a width slightly larger than the width of the user's vehicle. The same processing may be applied not only to the width direction but to the height direction. Additionally, there is no need to use information in the form of images when information sufficient to detect the surrounding environment can be acquired without using an image-capturing apparatus such as a stereo camera but by using, for example, a radar.

The above-described embodiments are provided as examples, and are not intended to limit the scope of the present invention. Each of these novel embodiments can be implemented in any of other various forms, and various omissions, substitutions, and alterations can be made thereto without departing from the spirit of the invention. The respective embodiments and modifications of these embodiments fall within the scope and spirit of the invention, and fall within the appended claims and equivalents thereof.

For example, each of the functions of each of the above-described embodiments explained with, for example, FIG.

14 and FIG. 17, is assumed to be implemented in the form of software by the three-dimensional object recognition program, but the function may be entirely or partially implemented in the form of hardware such as an integrated circuit (IC).

The three-dimensional object recognition program may be recorded and provided, as a file of an installable format or executable format, in a recording medium such as a compact disk read-only memory (CD-ROM) or a flexible disk (FD) that is readable by a computer apparatus Alternatively, the program may be recorded and provided on another recording medium such as a compact disk recordable (CD-R), a DVD, a Blu-ray Disc (trademark), or a semiconductor memory that is readable by a computer apparatus. Alternatively, the program may be provided through installation via a network such as the Internet. Alternatively, the program may be embedded in advance and provided in a ROM or the like inside equipment. DVD stands for "Digital Versatile Disk".

The above description for each of the embodiments assumes that a parallax image is generated from images captured by the stereo camera unit 1. However, a parallax image may be generated from a plurality of images captured by a single camera unit with the camera unit set at different positions for capturing the respective images so that parallax can be formed.

The present invention is effective in enabling equipment control according to danger levels and provision of useful information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device, comprising:
   processing circuitry configured to detect, from images obtained by imaging a range including a field of vision of an observer, a motion vector of an object included in the images, the motion vector indicating a direction of movement and a speed of movement of the object; and
   a display to perform display based on the detected motion vector, wherein
   the processing circuitry is further configured to determine a display image to display, based on the direction and the speed of the object, as indicated y the motion vector, and cause the display to display the determined display image in a superimposed manner on the field of vision of the observer.

2. The display device according to claim 1, wherein the processing circuitry is further configured to determine a danger level of the object based on the direction and speed of the object, as indicated by the motion vector, and
   cause the display to perform the display in accordance with the determined danger level.

3. The display device according to claim 2, wherein the processing circuitry is further configured to change a method of determining the danger level of the object in accordance with a recognition result of the object obtained from processing the images.

4. The display device according to claim 3, wherein the processing circuitry is further configured to change a threshold used in assigning the danger level, in accordance with the recognition result.

5. The display device according to claim 2, wherein the processing circuitry is further configured to cause the display to perform the display in a color according to the danger level.

6. The display device according to claim 1, wherein the display is a headup display.

7. The display device according to claim 6, wherein the headup display is a laser-scanning-type headup display.

8. The display device according to claim 1, wherein the processing circuitry is further configured to cause the display to perform the display in such a manner to superimpose, as the display image, a solid filled part on the field of vision of the observer.

9. The display device according to claim 8, wherein the display of the solid filled part is a gradation display that density thereof gradually changes.

10. The display device according to claim 1, wherein the processing circuitry is further configured to cause the display to perform the display in such a manner to superimpose, as the display image, a line on the field of vision of the observer.

11. The display device according to claim 1, wherein the processing circuitry is further configured to cause the display to perform the display, which changes along a traveling direction of the object.

12. The display device according to claim 11, wherein the processing circuitry is further configured to cause the display to perform the display such that luminance levels change along a traveling direction of the object.

13. The display device according to claim 1, wherein the processing circuitry is further configured to cause the display to display information of a predicted motion of the object.

14. The display device according to claim 13, wherein the processing circuitry is further configured to cause the display to perform the display based on a group of motion vectors that predict the motion of the object.

15. The display device according to claim 14, wherein the processing circuitry is further configured to cause the display to perform the display based on a normal-line group of the group of motion vectors.

16. The display device according to claim 13, wherein the display displays an animated image as the information of the predicted motion of the object.

17. The display device according to claim 1, wherein
   the display is mounted in a vehicle, and
   the processing circuitry is further configured to cause the display to display a moving route of the object positioned behind the vehicle in a traveling direction of the vehicle.

18. A vehicle comprising the display device according to claim 1.

19. A vehicle comprising the display device according to claim 2, wherein the vehicle controls the vehicle in accordance with the determined danger level.

20. A display method, comprising:
   detecting, from images obtained by imaging a range including a field of vision of an observer, a motion vector of an object included in the images, the motion vector indicating a direction of movement and a speed of movement of the object; and determining a display image to display, based on the direction and the speed of the object, as indicated by the motion vector;

displaying the determined display image in a superimposed manner on the field of vision of the observer.

* * * * *